(12) United States Patent
Qureshi

(10) Patent No.: US 8,850,050 B1
(45) Date of Patent: *Sep. 30, 2014

(54) PROVIDING A MANAGED BROWSER

(71) Applicant: Citrix Systems, Inc., Fort Lauderdale, FL (US)

(72) Inventor: Waheed Qureshi, Pleasanton, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/043,343

(22) Filed: Oct. 1, 2013

Related U.S. Application Data

(63) Continuation of application No. 14/040,831, filed on Sep. 30, 2013.

(60) Provisional application No. 61/866,229, filed on Aug. 15, 2013, provisional application No. 61/806,577, filed on Mar. 29, 2013.

(51) Int. Cl.
*G06F 15/16* (2006.01)

(52) U.S. Cl.
USPC ............ 709/229; 709/225; 709/227; 709/219

(58) Field of Classification Search
CPC ...................................................... H04L 63/20
USPC ........................................................ 709/229
See application file for complete search history.

(56) References Cited

U.S. PATENT DOCUMENTS

| | | |
|---|---|---|
| 5,805,803 A | 9/1998 | Birrell et al. |
| 6,151,606 A | 11/2000 | Mendez |
| 6,154,172 A | 11/2000 | Piccionelli et al. |
| 6,609,198 B1 | 8/2003 | Wood et al. |
| 6,621,766 B2 | 9/2003 | Brewer et al. |
| 6,859,879 B2 | 2/2005 | Henn et al. |
| 6,883,098 B1 | 4/2005 | Roman et al. |

(Continued)

FOREIGN PATENT DOCUMENTS

| | | |
|---|---|---|
| EP | 1465039 A1 | 10/2004 |
| EP | 2428894 A1 | 3/2012 |

(Continued)

OTHER PUBLICATIONS

Non-Final Office Action dated Dec. 20, 2013, in U.S. Appl. No. 14/043,301.

(Continued)

*Primary Examiner* — Hua Fan
(74) *Attorney, Agent, or Firm* — Banner & Witcoff, Ltd.

(57) ABSTRACT

Methods, systems, computer-readable media, and apparatuses for providing a managed browser are presented. In various embodiments, a computing device may load a managed browser. The managed browser may, for instance, be configured to provide a managed mode in which one or more policies are applied to the managed browser, and an unmanaged mode in which such policies might not be applied and/or in which the browser might not be managed by at least one device manager agent running on the computing device. Based on device state information and/or one or more policies, the managed browser may switch between the managed mode and the unmanaged mode, and the managed browser may provide various functionalities, which may include selectively providing access to enterprise resources, based on such state information and/or the one or more policies.

18 Claims, 15 Drawing Sheets

(56) References Cited

U.S. PATENT DOCUMENTS

| | | |
|---|---|---|
| 7,043,453 B2 | 5/2006 | Stefik et al. |
| 7,159,120 B2 | 1/2007 | Muratov et al. |
| 7,240,015 B1 | 7/2007 | Karmouch et al. |
| 7,254,831 B2 | 8/2007 | Saunders et al. |
| 7,269,605 B1 | 9/2007 | Nguyen et al. |
| 7,340,772 B2 | 3/2008 | Panasyuk et al. |
| 7,415,498 B2 | 8/2008 | Russo et al. |
| 7,490,073 B1 | 2/2009 | Qureshi et al. |
| 7,496,954 B1 | 2/2009 | Himawan et al. |
| 7,526,800 B2 | 4/2009 | Wright et al. |
| 7,529,923 B2 | 5/2009 | Chartrand et al. |
| 7,596,593 B2 | 9/2009 | Mitchell et al. |
| 7,599,991 B2 | 10/2009 | Vargas et al. |
| 7,697,737 B2 | 4/2010 | Aull et al. |
| 7,761,523 B2 | 7/2010 | May et al. |
| 7,788,535 B2 | 8/2010 | Bussa et al. |
| 7,788,536 B1 | 8/2010 | Qureshi et al. |
| 7,865,888 B1 | 1/2011 | Qureshi et al. |
| 7,904,468 B2 | 3/2011 | Neil et al. |
| 7,950,066 B1 | 5/2011 | Zuili |
| 7,966,323 B2 | 6/2011 | Bocking et al. |
| 7,966,652 B2 | 6/2011 | Ganesan |
| 7,970,386 B2 | 6/2011 | Bhat et al. |
| 8,001,278 B2 | 8/2011 | Huggahalli et al. |
| 8,012,219 B2 | 9/2011 | Mendez et al. |
| 8,037,421 B2 | 10/2011 | Scott et al. |
| 8,051,180 B2 | 11/2011 | Mazzaferri et al. |
| 8,060,074 B2 | 11/2011 | Danford et al. |
| 8,085,891 B2 | 12/2011 | Owen |
| 8,095,786 B1 | 1/2012 | Kshirsagar et al. |
| 8,126,128 B1 | 2/2012 | Hicks, III et al. |
| 8,126,506 B2 | 2/2012 | Roundtree |
| 8,214,887 B2 | 7/2012 | Clark et al. |
| 8,238,256 B2 | 8/2012 | Nugent |
| 8,239,918 B1 | 8/2012 | Cohen |
| 8,272,030 B1 | 9/2012 | Annan et al. |
| 8,296,239 B2 | 10/2012 | Nonaka |
| 8,332,464 B2 | 12/2012 | Dispensa et al. |
| 8,359,016 B2 | 1/2013 | Lindeman et al. |
| 8,365,258 B2 | 1/2013 | Dispensa |
| 8,402,011 B1 | 3/2013 | Bodenhamer |
| 8,418,238 B2 | 4/2013 | Platt et al. |
| 8,463,946 B2 | 6/2013 | Ferguson et al. |
| 8,468,090 B2 | 6/2013 | Lesandro et al. |
| 8,468,455 B2 | 6/2013 | Jorgensen et al. |
| 8,528,059 B1 | 9/2013 | Labana et al. |
| 8,560,709 B1 | 10/2013 | Shokhor et al. |
| 8,578,443 B2 | 11/2013 | Narain et al. |
| 8,601,562 B2 | 12/2013 | Milas |
| 8,613,070 B1 | 12/2013 | Borzycki et al. |
| 8,650,620 B2 | 2/2014 | Chawla et al. |
| 2002/0112047 A1 | 8/2002 | Kushwaha et al. |
| 2003/0031319 A1 | 2/2003 | Abe et al. |
| 2003/0037103 A1 | 2/2003 | Salmi et al. |
| 2003/0046366 A1 | 3/2003 | Pardikar et al. |
| 2003/0131245 A1 | 7/2003 | Linderman |
| 2004/0006706 A1* | 1/2004 | Erlingsson ............ 713/200 |
| 2004/0010579 A1 | 1/2004 | Freese |
| 2004/0083273 A1 | 4/2004 | Madison et al. |
| 2004/0111640 A1 | 6/2004 | Baum |
| 2004/0205233 A1 | 10/2004 | Dunk |
| 2004/0230807 A1 | 11/2004 | Baird et al. |
| 2005/0055578 A1 | 3/2005 | Wright et al. |
| 2005/0097608 A1 | 5/2005 | Penke et al. |
| 2005/0172241 A1 | 8/2005 | Daniels et al. |
| 2005/0255838 A1 | 11/2005 | Adams et al. |
| 2005/0273592 A1 | 12/2005 | Pryor et al. |
| 2006/0075123 A1 | 4/2006 | Burr et al. |
| 2006/0085826 A1 | 4/2006 | Funk et al. |
| 2006/0094400 A1 | 5/2006 | Beachem et al. |
| 2006/0117104 A1 | 6/2006 | Taniguchi et al. |
| 2006/0120526 A1 | 6/2006 | Boucher et al. |
| 2006/0141985 A1 | 6/2006 | Patel et al. |
| 2006/0147043 A1 | 7/2006 | Mann et al. |
| 2006/0161635 A1 | 7/2006 | Lamkin et al. |
| 2006/0224742 A1 | 10/2006 | Shahbazi |
| 2006/0225142 A1 | 10/2006 | Moon |
| 2006/0242685 A1 | 10/2006 | Heard et al. |
| 2007/0005713 A1 | 1/2007 | LeVasseur et al. |
| 2007/0011749 A1 | 1/2007 | Allison et al. |
| 2007/0038764 A1 | 2/2007 | Maillard |
| 2007/0049297 A1 | 3/2007 | Gopalan et al. |
| 2007/0056043 A1 | 3/2007 | Onyon et al. |
| 2007/0074033 A1 | 3/2007 | Adams et al. |
| 2007/0109983 A1 | 5/2007 | Shankar et al. |
| 2007/0156897 A1 | 7/2007 | Lim |
| 2007/0180447 A1 | 8/2007 | Mazzaferri et al. |
| 2007/0186106 A1 | 8/2007 | Ting et al. |
| 2007/0198656 A1 | 8/2007 | Mazzaferri et al. |
| 2007/0199051 A1 | 8/2007 | Parikh et al. |
| 2007/0204153 A1 | 8/2007 | Tome et al. |
| 2007/0204166 A1 | 8/2007 | Tome et al. |
| 2007/0214272 A1 | 9/2007 | Isaacson |
| 2007/0226225 A1 | 9/2007 | Yiu et al. |
| 2007/0226773 A1 | 9/2007 | Pouliot |
| 2008/0027982 A1 | 1/2008 | Subramanian et al. |
| 2008/0047015 A1 | 2/2008 | Cornwall et al. |
| 2008/0052395 A1 | 2/2008 | Wright et al. |
| 2008/0066020 A1 | 3/2008 | Boss et al. |
| 2008/0066177 A1 | 3/2008 | Bender |
| 2008/0070495 A1 | 3/2008 | Stricklen et al. |
| 2008/0127292 A1 | 5/2008 | Cooper et al. |
| 2008/0133729 A1 | 6/2008 | Fridman et al. |
| 2008/0134292 A1 | 6/2008 | Ariel et al. |
| 2008/0141335 A1 | 6/2008 | Thomas et al. |
| 2008/0163286 A1 | 7/2008 | Rudolph et al. |
| 2008/0196038 A1 | 8/2008 | Antonio et al. |
| 2008/0209506 A1 | 8/2008 | Ghai et al. |
| 2008/0214300 A1 | 9/2008 | Williams et al. |
| 2008/0235760 A1 | 9/2008 | Broussard et al. |
| 2008/0313648 A1 | 12/2008 | Wang et al. |
| 2008/0318616 A1 | 12/2008 | Chipalkatti et al. |
| 2009/0006232 A1 | 1/2009 | Gallagher et al. |
| 2009/0028049 A1 | 1/2009 | Boudreau et al. |
| 2009/0030968 A1 | 1/2009 | Boudreau et al. |
| 2009/0077638 A1 | 3/2009 | Norman et al. |
| 2009/0119773 A1 | 5/2009 | D'Amore et al. |
| 2009/0170532 A1 | 7/2009 | Lee et al. |
| 2009/0172789 A1 | 7/2009 | Band et al. |
| 2009/0178111 A1 | 7/2009 | Moriconi et al. |
| 2009/0199277 A1 | 8/2009 | Norman et al. |
| 2009/0221278 A1 | 9/2009 | Spelta et al. |
| 2009/0222880 A1 | 9/2009 | Mayer et al. |
| 2009/0228714 A1 | 9/2009 | Fiske et al. |
| 2009/0228954 A1 | 9/2009 | Hu et al. |
| 2009/0228963 A1 | 9/2009 | Pearce et al. |
| 2009/0249359 A1 | 10/2009 | Caunter et al. |
| 2009/0325615 A1 | 12/2009 | McKay et al. |
| 2010/0077469 A1 | 3/2010 | Furman et al. |
| 2010/0100825 A1 | 4/2010 | Sharoni |
| 2010/0100925 A1 | 4/2010 | Hinton |
| 2010/0124196 A1 | 5/2010 | Bonar et al. |
| 2010/0146523 A1 | 6/2010 | Brigaut et al. |
| 2010/0150341 A1 | 6/2010 | Dodgson et al. |
| 2010/0154025 A1 | 6/2010 | Esteve Balducci et al. |
| 2010/0192212 A1 | 7/2010 | Raleigh |
| 2010/0229197 A1 | 9/2010 | Yi et al. |
| 2010/0248699 A1 | 9/2010 | Dumais |
| 2010/0287619 A1 | 11/2010 | Chase |
| 2010/0299152 A1 | 11/2010 | Batchu et al. |
| 2010/0299376 A1 | 11/2010 | Batchu et al. |
| 2010/0317336 A1 | 12/2010 | Ferren et al. |
| 2010/0319053 A1 | 12/2010 | Gharabally |
| 2010/0325097 A1 | 12/2010 | Er et al. |
| 2011/0145833 A1 | 6/2011 | De Los Reyes et al. |
| 2011/0154477 A1 | 6/2011 | Parla et al. |
| 2011/0179484 A1 | 7/2011 | Tuvell et al. |
| 2011/0208838 A1 | 8/2011 | Thomas et al. |
| 2011/0209064 A1 | 8/2011 | Jorgensen et al. |
| 2011/0219124 A1* | 9/2011 | Allen et al. ............ 709/227 |
| 2011/0225417 A1 | 9/2011 | Maharajh et al. |
| 2011/0239125 A1 | 9/2011 | Kristensen et al. |
| 2011/0252232 A1 | 10/2011 | De Atley et al. |
| 2011/0258301 A1 | 10/2011 | McCormick et al. |

(56) References Cited

U.S. PATENT DOCUMENTS

| | | |
|---|---|---|
| 2011/0271279 A1 | 11/2011 | Pate |
| 2011/0276683 A1 | 11/2011 | Goldschlag et al. |
| 2011/0276699 A1 | 11/2011 | Pedersen |
| 2011/0295970 A1 | 12/2011 | Miyazawa |
| 2012/0005476 A1 | 1/2012 | Wei et al. |
| 2012/0005724 A1 | 1/2012 | Lee |
| 2012/0005745 A1 | 1/2012 | Wei et al. |
| 2012/0005746 A1 | 1/2012 | Wei et al. |
| 2012/0023506 A1 | 1/2012 | Maeckel et al. |
| 2012/0036347 A1 | 2/2012 | Swanson et al. |
| 2012/0036370 A1 | 2/2012 | Lim et al. |
| 2012/0052954 A1 | 3/2012 | Zhu et al. |
| 2012/0066691 A1 | 3/2012 | Branton |
| 2012/0079475 A1 | 3/2012 | Hicks, III et al. |
| 2012/0084184 A1 | 4/2012 | Raleigh et al. |
| 2012/0088540 A1 | 4/2012 | Smith et al. |
| 2012/0109384 A1 | 5/2012 | Stepanian |
| 2012/0117622 A1 | 5/2012 | Gronholm et al. |
| 2012/0129503 A1 | 5/2012 | Lindeman et al. |
| 2012/0131116 A1 | 5/2012 | Tu et al. |
| 2012/0131685 A1 | 5/2012 | Broch et al. |
| 2012/0154413 A1 | 6/2012 | Kim et al. |
| 2012/0157165 A1 | 6/2012 | Kim et al. |
| 2012/0157166 A1 | 6/2012 | Kim et al. |
| 2012/0159139 A1 | 6/2012 | Kim et al. |
| 2012/0165075 A1 | 6/2012 | Kim et al. |
| 2012/0166524 A1 | 6/2012 | Watakabe et al. |
| 2012/0166997 A1 | 6/2012 | Cho et al. |
| 2012/0167118 A1 | 6/2012 | Pingili et al. |
| 2012/0179802 A1 | 7/2012 | Narasimhan et al. |
| 2012/0179909 A1 | 7/2012 | Sagi et al. |
| 2012/0185910 A1 | 7/2012 | Miettinen et al. |
| 2012/0185913 A1 | 7/2012 | Martinez et al. |
| 2012/0198570 A1 | 8/2012 | Joa et al. |
| 2012/0204220 A1 | 8/2012 | Lavi |
| 2012/0214472 A1 | 8/2012 | Tadayon et al. |
| 2012/0222120 A1 | 8/2012 | Rim et al. |
| 2012/0238257 A1 | 9/2012 | Anson |
| 2012/0240183 A1 | 9/2012 | Sinha |
| 2012/0254768 A1 | 10/2012 | Aggarwal et al. |
| 2012/0272221 A1 | 10/2012 | Pessoa et al. |
| 2012/0278454 A1 | 11/2012 | Stewart et al. |
| 2012/0284325 A1 | 11/2012 | Erb |
| 2012/0284779 A1 | 11/2012 | Ingrassia, Jr. et al. |
| 2012/0290694 A9 | 11/2012 | Marl et al. |
| 2012/0303476 A1 | 11/2012 | Krzyzanowski et al. |
| 2012/0303778 A1 | 11/2012 | Ahiska et al. |
| 2012/0304310 A1 | 11/2012 | Blaisdell |
| 2012/0311154 A1 | 12/2012 | Morgan |
| 2012/0311659 A1 | 12/2012 | Narain et al. |
| 2012/0324568 A1 | 12/2012 | Wyatt et al. |
| 2012/0331527 A1 | 12/2012 | Walters et al. |
| 2012/0331528 A1 | 12/2012 | Fu et al. |
| 2013/0002725 A1 | 1/2013 | Kim et al. |
| 2013/0007842 A1 | 1/2013 | Park et al. |
| 2013/0013653 A1 | 1/2013 | Thompson |
| 2013/0013688 A1 | 1/2013 | Wang et al. |
| 2013/0014239 A1 | 1/2013 | Pieczul et al. |
| 2013/0024424 A1 | 1/2013 | Prahlad et al. |
| 2013/0024928 A1 | 1/2013 | Burke et al. |
| 2013/0042294 A1 | 2/2013 | Colvin et al. |
| 2013/0054922 A1 | 2/2013 | Tuch et al. |
| 2013/0054962 A1 | 2/2013 | Chawla et al. |
| 2013/0055378 A1 | 2/2013 | Chang et al. |
| 2013/0059284 A1 | 3/2013 | Giedgowd, Jr. et al. |
| 2013/0066960 A1 | 3/2013 | Fieremans et al. |
| 2013/0074142 A1 | 3/2013 | Brennan et al. |
| 2013/0084847 A1 | 4/2013 | Tibbitts et al. |
| 2013/0086684 A1 | 4/2013 | Mohler |
| 2013/0091543 A1 | 4/2013 | Wade et al. |
| 2013/0097421 A1 | 4/2013 | Lim |
| 2013/0111540 A1 | 5/2013 | Sabin |
| 2013/0117240 A1 | 5/2013 | Taylor et al. |
| 2013/0117805 A1 | 5/2013 | Kent et al. |
| 2013/0130651 A1 | 5/2013 | Deasy et al. |
| 2013/0130652 A1 | 5/2013 | Deasy et al. |
| 2013/0132457 A1 | 5/2013 | Diwakar |
| 2013/0132941 A1 | 5/2013 | Lindeman et al. |
| 2013/0133061 A1 | 5/2013 | Fainkichen et al. |
| 2013/0138766 A1 | 5/2013 | Draluk et al. |
| 2013/0138810 A1 | 5/2013 | Binyamin et al. |
| 2013/0139241 A1 | 5/2013 | Leeder |
| 2013/0142043 A1 | 6/2013 | Tapia et al. |
| 2013/0145448 A1 | 6/2013 | Newell |
| 2013/0151598 A1 | 6/2013 | Fu et al. |
| 2013/0171967 A1 | 7/2013 | Ashour et al. |
| 2013/0219176 A1 | 8/2013 | Akella et al. |
| 2013/0219211 A1 | 8/2013 | Gopinath et al. |
| 2013/0219456 A1 | 8/2013 | Sharma et al. |
| 2013/0227659 A1 | 8/2013 | Raleigh |
| 2013/0232541 A1 | 9/2013 | Kapadia et al. |
| 2013/0254262 A1 | 9/2013 | Udall |
| 2013/0254660 A1 | 9/2013 | Fujioka |
| 2013/0254831 A1 | 9/2013 | Roach et al. |
| 2013/0263208 A1 | 10/2013 | Challa |
| 2013/0263209 A1 | 10/2013 | Panuganty |
| 2013/0291052 A1 | 10/2013 | Hadar et al. |
| 2013/0297604 A1 | 11/2013 | Sutedja et al. |
| 2013/0297662 A1 | 11/2013 | Sharma et al. |
| 2013/0298185 A1 | 11/2013 | Koneru et al. |
| 2013/0298201 A1 | 11/2013 | Aravindakshan et al. |
| 2013/0298242 A1 | 11/2013 | Kumar et al. |
| 2013/0303194 A1 | 11/2013 | Rowles |
| 2013/0311597 A1 | 11/2013 | Arrouye et al. |
| 2013/0318345 A1 | 11/2013 | Hengeveld |
| 2013/0333005 A1 | 12/2013 | Kim et al. |
| 2013/0346268 A1 | 12/2013 | Pereira et al. |
| 2014/0006347 A1 | 1/2014 | Qureshi et al. |
| 2014/0007183 A1 | 1/2014 | Qureshi et al. |
| 2014/0020062 A1 | 1/2014 | Tumula et al. |
| 2014/0020073 A1 | 1/2014 | Ronda et al. |
| 2014/0032691 A1 | 1/2014 | Barton et al. |
| 2014/0032733 A1 | 1/2014 | Barton et al. |
| 2014/0032758 A1 | 1/2014 | Barton et al. |
| 2014/0032759 A1 | 1/2014 | Barton et al. |
| 2014/0033271 A1 | 1/2014 | Barton et al. |
| 2014/0040638 A1 | 2/2014 | Barton et al. |
| 2014/0040656 A1 | 2/2014 | Ho et al. |
| 2014/0040977 A1 | 2/2014 | Barton et al. |
| 2014/0040978 A1 | 2/2014 | Barton et al. |
| 2014/0040979 A1 | 2/2014 | Barton et al. |
| 2014/0059640 A9 | 2/2014 | Raleigh et al. |
| 2014/0059642 A1 | 2/2014 | Deasy et al. |

FOREIGN PATENT DOCUMENTS

| | | |
|---|---|---|
| GB | 2411320 A | 8/2005 |
| GB | 2462442 A | 2/2010 |
| WO | 9914652 A1 | 3/1999 |
| WO | 02084460 A2 | 10/2002 |
| WO | 2004107646 A1 | 12/2004 |
| WO | 2007113709 A1 | 10/2007 |
| WO | 2008086611 A1 | 7/2008 |
| WO | 2010115289 A1 | 10/2010 |

OTHER PUBLICATIONS

Non-Final Office Action dated Dec. 27, 2013, in U.S. Appl. No. 14/042,941.

Non-Final Office Action dated Dec. 27, 2013, in U.S. Appl. No. 14/043,012.

Non-Final Office Action dated Dec. 30, 2013, in U.S. Appl. No. 14/043,164.

Non-Final Office Action dated Dec. 31, 2013, in U.S. Appl. No. 14/042,984.

Non-Final Office Action dated Jan. 6, 2014, in U.S. Appl. No. 14/043,229.

"Citrix XenMobile Technology Overview: White Paper," Citrix White Papers online, Jul. 31, 2012, pp. 1-14; retrieved from http://insight.com/content/aam/insight/en_US/pdfs/citrix/xenmobile-tech-overview.pdf, retrieved Jan. 27, 2014.

Lowe, "Application-Specific VPNs," Dec. 13, 2005.

(56) References Cited

OTHER PUBLICATIONS

International Search Report and Written Opinion mailed Nov. 26, 2013 in Internation Application No. PCT/US2013/060388.
Xuetao Wei, et al., "Malicious Android Applications in the Enterprise: What Do They Do and How Do We Fix It?,"• ICDE Workshop on Secure Data Management on Smartphones and Mobiles, Apr. 2012, 4 pages.
Ranjan et al., "Programming Cloud Resource Orchestration Framework: Operations and Research Challenges", arvix.org, 2012, pp. 1-19.
Na et al., "Personal Cloud Computing Security Framework," 2010 IEEE Asia-Pacific Computing Conference, 2010, pp. 671-675.
Wilson et al., "Unified Security Framework", In proceedings of the 1st International Symposium on Information and Communication Technologies, pp. 500-505. Trinity College Dublin, 2003.
Mysore et al., "The Liquid Media System—a Multi-Device Streaming Media Orchestration Framework", Ubicomp 2003 Workshop, pp. 1-4.
Written Opinion and International Search Report, PCT/US2013/062636, Jan. 10, 2014.
International Search Report and Written Opinion dated Feb. 4, 2014 in Application No. PCT/US2013/064349.
International Search Report and Written Opinion mailed Jan. 21, 2014 in International Application No. PCT/US2013/063856.
Apple Inc., iPad User Guide for iOS 6.1 Software, Jan. 2013, Chapter 26, Accessibility, pp. 107-108.

* cited by examiner

PROVIDING A MANAGED BROWSER

CROSS-REFERENCE TO RELATED APPLICATIONS

This application is a continuation of U.S. patent application Ser. No. 14/040,831, filed Sep. 30, 2013, and entitled "PROVIDING A MANAGED BROWSER," and which is incorporated by reference herein in its entirety. In addition, this application claims the benefit of U.S. Provisional Patent Application Ser. No. 61/866,229, filed Aug. 15, 2013, and entitled "PROVIDING A SECURE BROWSER," and which is incorporated by reference herein in its entirety. This application also claims the benefit of U.S. Provisional Patent Application Ser. No. 61/806,577, filed Mar. 29, 2013, and entitled "SYSTEMS AND METHODS FOR ENTERPRISE MOBILITY MANAGEMENT," and which is incorporated by reference herein in its entirety.

BACKGROUND

Aspects of the disclosure relate to computer hardware and software. In particular, one or more aspects of the disclosure generally relate to computer hardware and software for providing a managed browser.

Increasingly, corporations and other organizations are providing and/or otherwise enabling their employees and other associates with mobile devices, such as smart phones, tablet computers, and other mobile computing devices. As these devices continue to grow in popularity and provide an increasing number of functions, many organizations may wish to place certain controls on how these devices can be used, what resources these devices can access, and how the applications running on these devices can interact with other resources.

SUMMARY

Various aspects of the disclosure provide more efficient, effective, functional, and convenient ways of controlling how mobile devices can be used, what resources mobile devices can access, and how the applications and other software running on these devices can interact with other resources. In particular, in one or more embodiments discussed in greater detail below, a managed browser can be deployed, implemented, and/or used in a number of different ways to provide one or more of these and/or other advantages.

In some embodiments, a computing device may load a managed browser. Subsequently, the computing device may receive a request to access one or more enterprise resources via the managed browser. Then, the computing device may create at least one application tunnel from the managed browser to the one or more enterprise resources. The computing device then may obtain enterprise data from the one or more enterprise resources via the at least one application tunnel.

In some embodiments, a computing device may load a managed browser. Subsequently, the computing device may establish a connection to at least one other computing device to initiate a device cloud. Then, the computing device may extend a session of the managed browser across the device cloud.

In some embodiments, a computing device may load a managed browser. Subsequently, the computing device may obtain device state information. Then, the computing device may determine, based on the device state information, whether to selectively disable one or more operational modes of the managed browser. In response to determining to selectively disable at least one operational mode of the managed browser, the computing device may cause the at least one operational mode to be disabled.

In some embodiments, a computing device may load a managed browser. Subsequently, the computing device may receive one or more policies. Then, the computing device may apply the one or more policies to the managed browser.

In some embodiments, a computing device may load a managed browser. Subsequently, the computing device may receive a request to access one or more enterprise resources via the managed browser. Then, the computing device may obtain enterprise data from the one or more enterprise resources based on the request. The computing device then may store the obtained enterprise data in a secure document container.

In some embodiments, a computing device may load a managed browser. Subsequently, the computing device may receive a single sign-on (SSO) credential that is associated with at least one user account. Then, the computing device may obtain enterprise data from one or more enterprise resources based on the SSO credential. The computing device then may provide access to the obtained enterprise data via the managed browser.

In some embodiments, a computing device may load a managed browser. Subsequently, the computing device may receive a request to access an application store via the managed browser. Then, the computing device may obtain enterprise data from the application store based on the request.

In some embodiments, a computing device may load a managed browser. Subsequently, the computing device may receive a request to access one or more enterprise resources via the managed browser. Then, the computing device may obtain enterprise data from the one or more enterprise resources based on the request. The computing device then may control the obtained enterprise data based on one or more policies.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings identified above, which form a part hereof, and in which is shown by way of illustration various embodiments in which various aspects of the disclosure may be practiced. Other embodiments may be utilized, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As noted above, certain embodiments are discussed herein that relate to providing a managed browser. Before discussing these concepts in greater detail, however, several examples of computing architecture and enterprise mobility management architecture that may be used in implementing and/or otherwise providing various aspects of the disclosure will first be discussed with respect to FIGS. 1-4.

Computing Architecture

Figure 1:
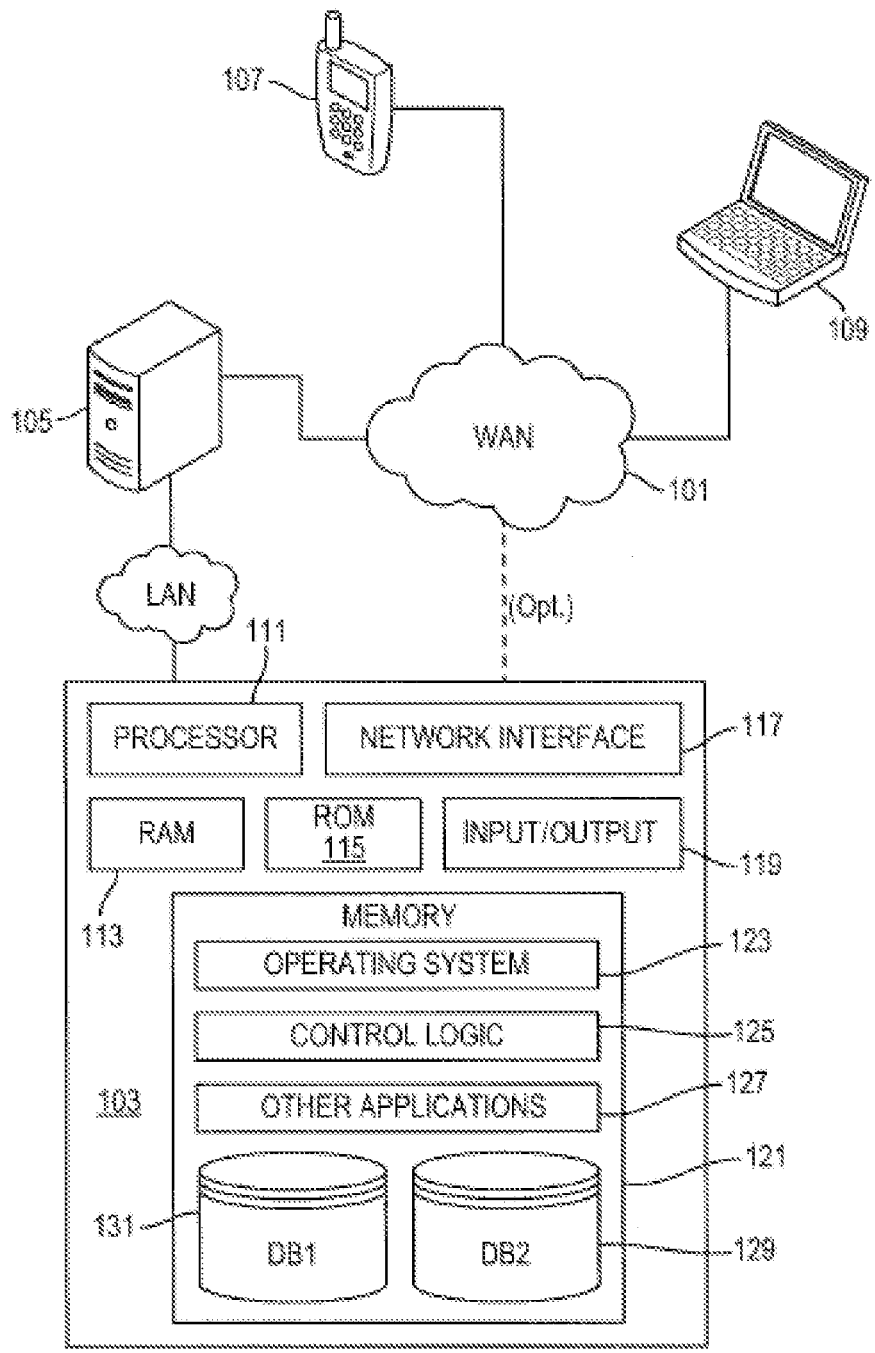
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MAN), wireless networks, personal networks (PAN), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
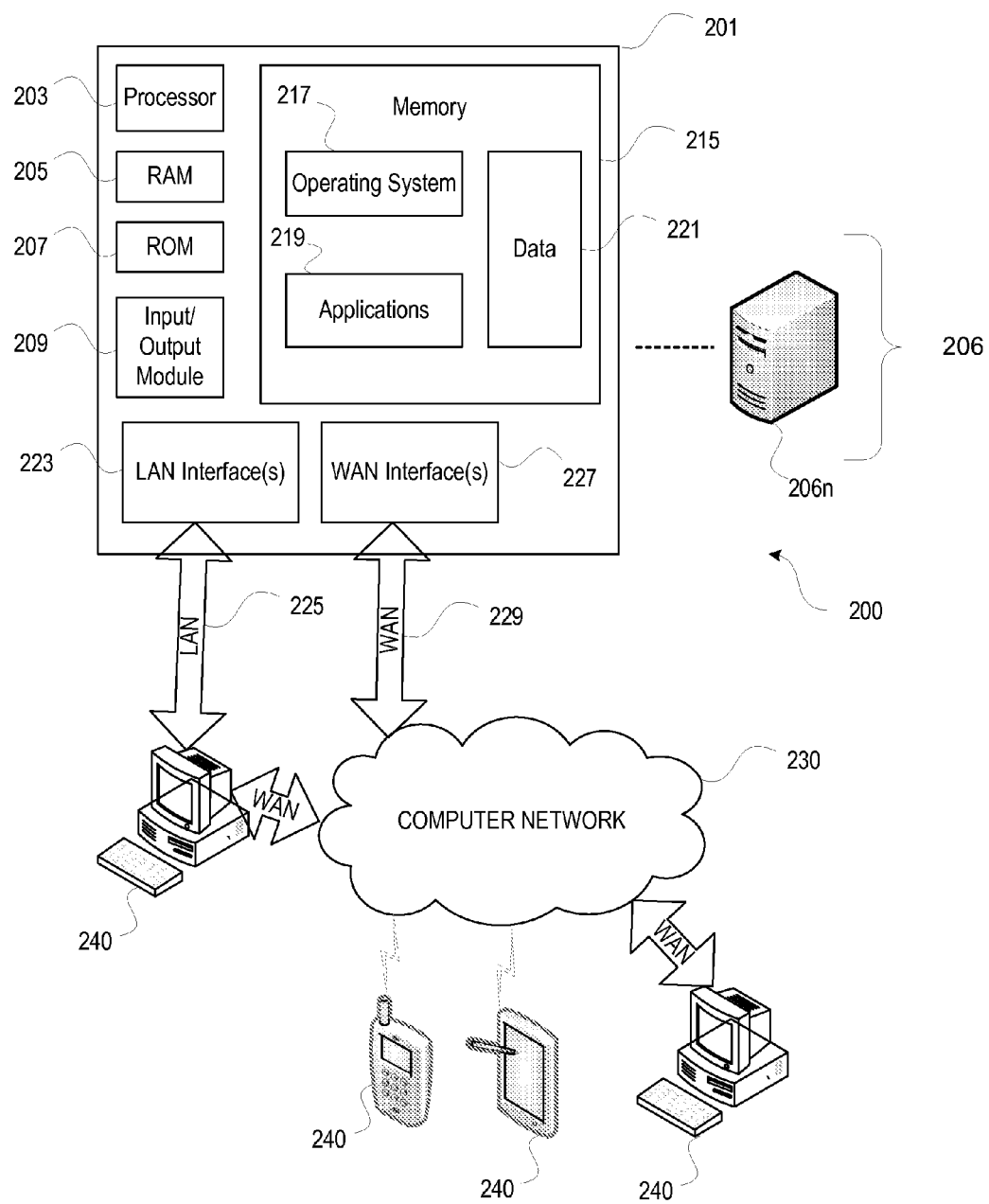
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, mini-computers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine client agent program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Enterprise Mobility Management Architecture

Figure 3:
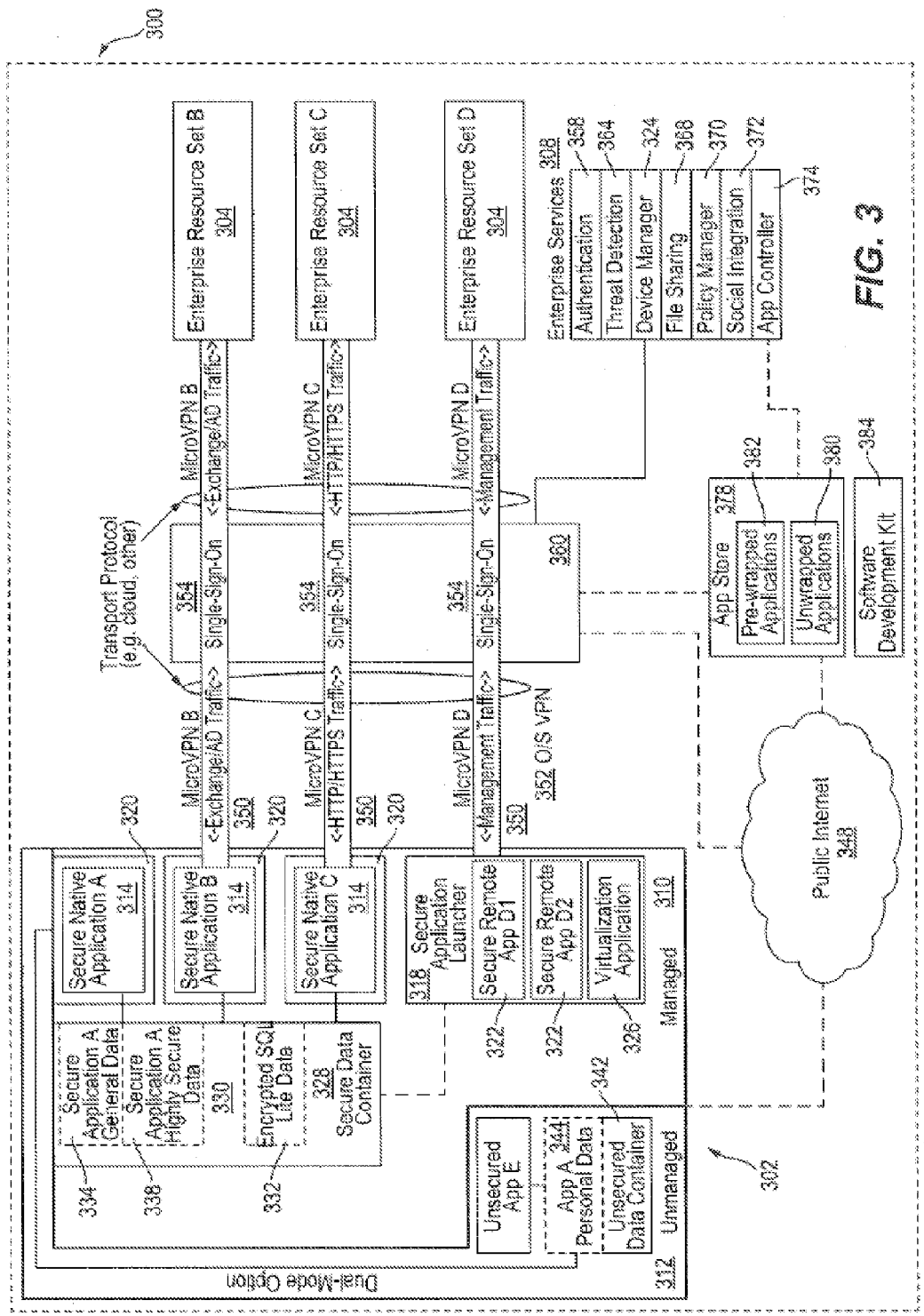
FIG. 3 depicts an illustrative enterprise mobility management system that may be used in accordance with one or more illustrative aspects described herein.

FIG. 3 represents an enterprise mobility technical architecture 300 for use in an enterprise environment, a BYOD environment, or other mobile environments. The architecture enables a user of a mobile device 302 (e.g., as client 107, 211, or otherwise) to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to the user. The user may utilize the mobile device 302 for business use only or for business and personal use. The mobile device may run an iOS operating system, Android operating system, and/or the like. The enterprise may choose to implement policies to manage the mobile device 304. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 304 that is managed through the application of mobile device management policies may be referred to as an enrolled device.

The operating system of the mobile device may be separated into a managed partition 310 and an unmanaged partition 312. The managed partition 310 may have policies applied to it to secure the applications running on and data stored in the managed partition. The applications running on the managed partition may be secure applications. The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The applications running on the managed partition may be stabilized applications. The stabilized applications may be managed by a device manager 324. The device manager 324 may monitor the stabilized applications and utilize techniques for detecting and remedying problems that would result in a destabilized application if such techniques were not utilized to detect and remedy the problems.

The secure applications may access data stored in a secure data container 328 in the managed partition 310 of the mobile device. The data secured in the secure data container may be accessed by the secure wrapped applications 314, applications executed by a secure application launcher 318, virtualization applications 326 executed by a secure application launcher 318, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as AES 128-bit encryption or the like, while highly secure data 338 may use a very strong form of encryption such as AES 254-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured mode. In an unsecured mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications 348 that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections may be specific to particular applications 350, particular devices, particular secured areas on the mobile device, and the like (e.g., 352). For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include SHAREFILE servers, other file sharing services, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 380, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use user interface. The application store 378 may provide access to a software development kit 384. The software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
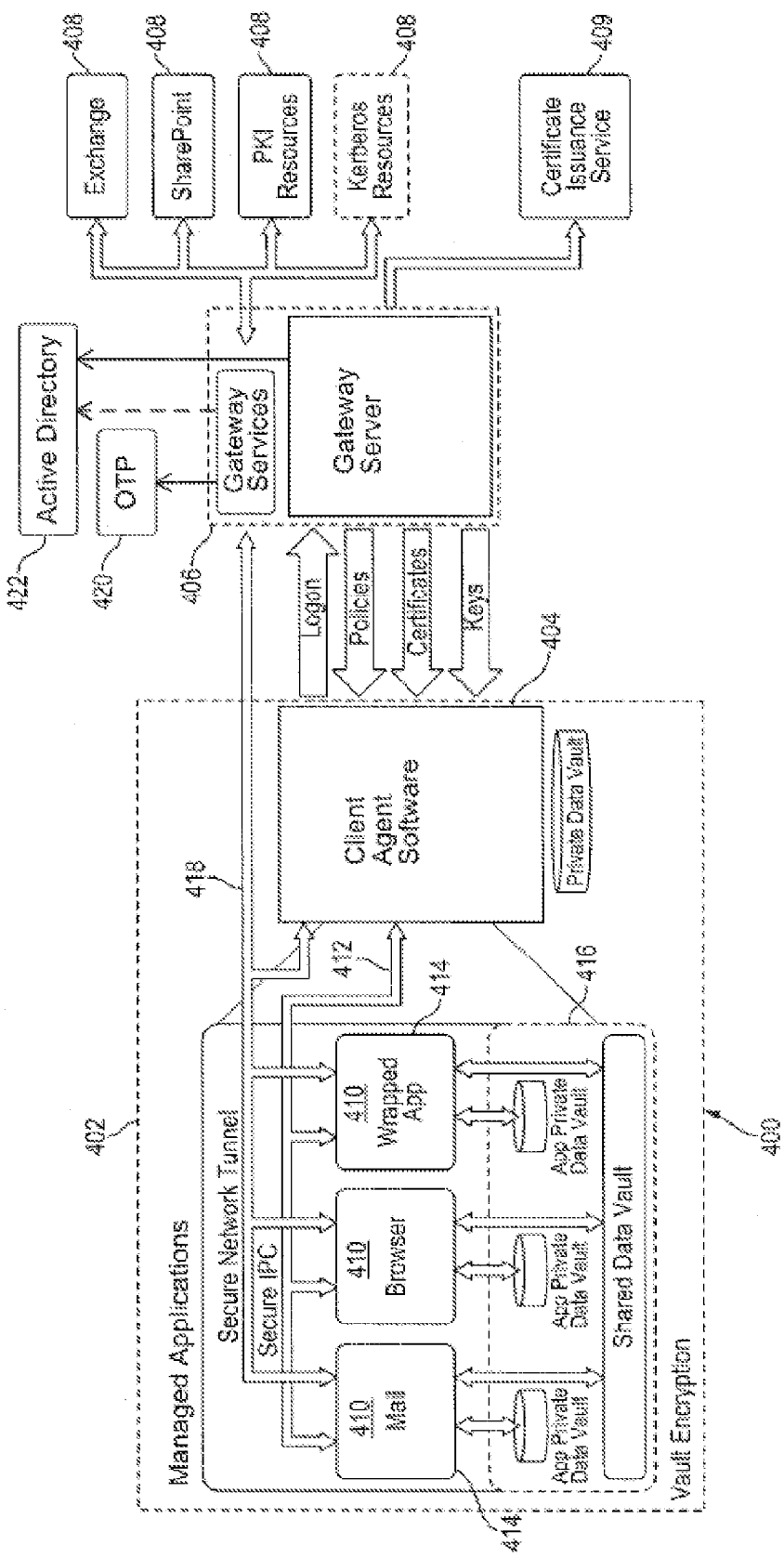
FIG. 4 depicts another illustrative enterprise mobility management system that may be used in accordance with one or more illustrative aspects described herein.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled mobile device 402 (e.g., client 107, 212, 302, etc.) with a client agent 404, which interacts with gateway server 406 (which includes access gateway and application controller functionality) to access various enterprise resources 408 and services 409 such as Exchange, Sharepoint, PKI Resources, Kerberos Resources, and Certificate Issuance Service, as shown on the right hand side above. Although not specifically shown, the mobile device 402 may also interact with an enterprise application store (e.g., StoreFront) for the selection and downloading of applications. Client agent 404 may, for example, be a software application executing on a client device that facilitates communications with remote resources and/or virtualized resources. Gateway server 406 may, for example, be a server or other resource that provides access to enterprise resources and/or cloud resources.

The client agent 404 acts as the UI (user interface) intermediary for Windows apps/desktops hosted in an Enterprise data center, which are accessed using the HDX/ICA display remoting protocol, or any other remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and an application management framework, such as MDX (mobile experience technology) by Citrix Systems Inc. of Fort Lauderdale, Fla. (other application management frameworks may also be used), act to provide policy driven management capabilities and features such as connectivity and SSO (single sign on) to enterprise resources/services 408. The client agent 404 handles primary user authentication to the enterprise, normally to the access gateway (AG) with SSO to other gateway server components. The client agent 404 obtains policies from gateway server 406 to control the behavior of the managed applications 410 on the mobile device 402. As used herein, a managed application is one that is capable of being controlled based on and operated in accordance with independently defined and communicated policy files.

The secure IPC links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 614 on first launch of an application 410 to initialize the secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through access gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The mail and browser managed applications 410 have special status and may make use of facilities that might not be generally available to arbitrary wrapped applications. For example, the mail application may use a special background network access mechanism that allows it to access Exchange over an extended period of time without requiring a full AD logon. The browser application may use multiple private data vaults to segregate different kinds of data.

This architecture supports the incorporation of various other security features. For example, gateway server 406 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want the enterprise application store to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the application management framework micro VPN feature). For example, an application such as a corporate email application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an enterprise special purpose web service to support the issuance of client certificates to allow relevant managed applications to authenticate to internal PKI protected resources.

The client agent 404 and application management framework 414 may be enhanced to support obtaining and using client certificates for authentication to internal PKI protected network resources. More than one certificate may be supported, such as to match various levels of security and/or separation requirements. The certificates may be used by the mail and browser managed applications, and ultimately by arbitrary wrapped applications (provided those applications use web service style communication patterns where it is reasonable for application management framework to mediate HTTPS requests).

Application management framework client certificate support on iOS may rely on importing a PKCS 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to AD 422, using an AD password or trusted client certificate, and obtain Kerberos service tickets to respond to HTTP negotiate authentication challenges. The limited support feature relates to constrained delegation in AFEE, where AFEE supports invoking Kerberos protocol transition so it can obtain and use Kerberos service tickets (subject to constrained delegation) in response to HTTP negotiate authentication challenges. This mechanism works in reverse web proxy (a.k.a. CVPN) mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of the enterprise application store and application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Managed Browser Features

Having discussed several examples of the computing architecture and the enterprise mobility management architecture that may be used in providing and/or implementing various aspects of the disclosure, a number of embodiments will now be discussed in greater detail. In particular, and as introduced above, some aspects of the disclosure generally relate to providing a managed browser. In the description below, various examples illustrating how a managed browser may be provided in accordance with one or more embodiments will be discussed.

Figure 5:
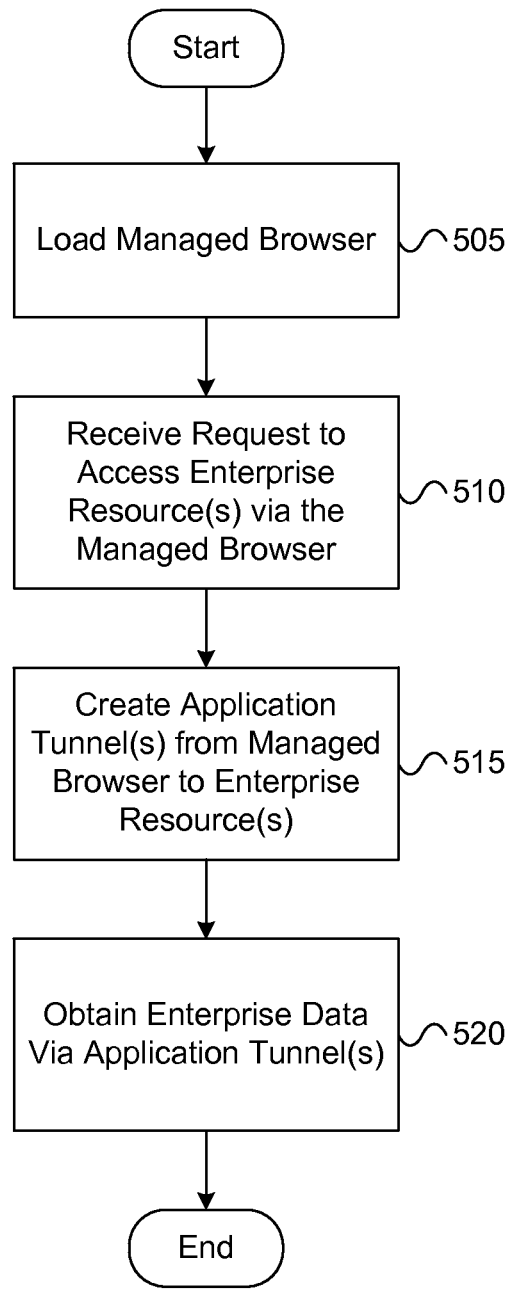
FIG. 5 depicts a flowchart that illustrates a method of creating an application tunnel from a managed browser to one or more enterprise resources in accordance with one or more illustrative aspects discussed herein.

FIG. 5 depicts a flowchart that illustrates a method of creating an application tunnel from a managed browser to one or more enterprise resources in accordance with one or more illustrative aspects discussed herein. In one or more embodiments, the method illustrated in FIG. 5 and/or one or more steps thereof may be performed by a computing device (e.g., generic computing device 201). In other embodiments, the method illustrated in FIG. 5 and/or one or more steps thereof may be embodied in computer-executable instructions that are stored in a computer-readable medium, such as a non-transitory computer-readable memory.

As seen in FIG. 5, the method may begin at step 505 in which a managed browser may be loaded. For example, in step 505, a computing device (e.g., a mobile computing device, such as a laptop computer, tablet computer, smart phone, or other type of mobile device) may load a managed browser (e.g., by opening and/or otherwise initiating execution of a managed browser). In one or more embodiments, the managed browser may be a web browser that is configured to provide one or more enterprise security features (e.g., mobile device management features, mobile application management features, policy acquisition and enforcement features, etc.). Additionally or alternatively, the managed browser may extend various enterprise security features for use with mobile device applications that may be configured to run within the browser. For example, an enterprise may require some or all of its employees and/or other users to install and use the managed browser on their respective mobile devices in a bring-your-own-device (BYOD) scheme to reduce enterprise security risks. In addition, the managed browser can, for instance, be used to enable mobile device users to access a corporate intranet and/or other enterprise resources without connecting to a virtual private network (VPN). For instance, the managed browser may implement and/or provide application tunneling functionalities, such as those discussed in greater detail below, to enable such access to a corporate intranet and/or other enterprise resources.

In one or more embodiments, the managed browser may additionally or alternatively be configured to provide secure browsing and caching of data obtained from at least one enterprise resource. For example, in addition to being configured to obtain data from an enterprise resource (e.g., a server or database connected to and/or otherwise part of an enterprise network), the managed browser may be further configured to securely cache the obtained data (e.g., in one or more local caches, which may be encrypted using one or more encryption protocols). Additionally or alternatively, the managed browser may be further configured to provide secure browsing of the obtained data (e.g., by controlling and providing access to the obtained data based on validation of one or more authentication credentials, based on compliance with and/or enforcement of one or more mobile device management and/or mobile application management policies, etc.).

In one or more embodiments, the managed browser may be configured to provide at least one managed mode in which one or more policies are applied to the managed browser. The one or more policies may, for instance, be configured to limit one or more functions of the managed browser. For example, the one or more policies may selectively restrict the types of information that can be accessed using the managed browser, the resources (e.g., enterprise resources, network resources, etc.) that can be accessed using the managed browser, the users that can access information using the managed browser, the times at which the managed browser can be used to access specific types of information, the locations at which the managed browser can be used to access specific types of information, and/or other may impose other restrictions. In some arrangements, at least one policy of the one or more policies may limit and/or otherwise restrict application tunneling functionalities of the managed browser, as discussed below. Additionally or alternatively, the managed browser may be configured to provide at least one unmanaged mode in which the one or more policies (which, e.g., may be applied to the browser in the managed mode) might not be applied to the managed browser, such that the managed browser may operate without the restrictions that might be imposed by the one or more policies.

In step 510, a request to access one or more enterprise resources via the managed browser may be received. For example, in step 510, the computing device may receive a request to access one or more enterprise resources via the managed browser. Such a request may, for instance, be based on and/or correspond to user input received by the computing device via the managed browser (e.g., based on a user selecting a link and/or otherwise requesting access to a network resource using the managed browser).

In step 515, at least one application tunnel may be created from the managed browser to the one or more enterprise resources. For example, in step 515, the computing device may create and/or otherwise establish one or more VPN-style tunnels to enterprise servers and/or other enterprise resources that may, for instance, enable the managed browser to securely access and obtain enterprise data from the enterprise servers and/or other enterprise resources. In one or more arrangements, application tunneling may include techniques in which one network protocol (e.g., the delivery protocol) encapsulates a different network protocol. By using application tunneling, a secure path may be provided through an untrusted network.

In some embodiments, creating the at least one application tunnel may include creating a first application tunnel from the managed browser to a first enterprise resource, and creating a second application tunnel from the managed browser to a second enterprise resource, where the second enterprise resource is different from the first enterprise resource. For example, in creating one or more application tunnels (e.g., in step 515), the computing device may create a different individual application tunnel for each enterprise resource that may be accessed by the managed browser. In some instances, the first enterprise resource may have a first security level and the second enterprise resource may have a second security level different from the first security level. For example, the second enterprise resource may have a higher security level than the first enterprise resource, and additional authentication credentials and/or more secure access protocols and/or encryption methods may be needed to access the second enterprise resource (e.g., as compared to accessing the first enterprise resource).

In some embodiments, the at least one application tunnel may be created (e.g., in step 515) based on one or more policies that may be applied to the managed browser. For example, in creating the at least one application tunnel, the managed browser and/or the computing device on which the managed browser is running may create the at least one application tunnel in accordance with one or more policies that may be applied to the managed browser and/or may selectively limit and/or otherwise restrict the managed browser's ability to create and/or use application tunnels. For example, at least one policy of the one or more policies may selectively restrict the types of information that can be accessed using an application tunnel, the resources that can be accessed using an application tunnel, the users that can access information using an application tunnel, the times at which the managed browser can create an application tunnel, the locations at which the managed browser can create an application tunnel, and/or other may impose other restrictions.

In step 520, enterprise data from the one or more enterprise resources may be obtained via the at least one application tunnel. For example, in step 520, the computing device may obtain enterprise data from the one or more enterprise resources via the application tunnel(s) created in step 515. In addition to obtaining the enterprise data, the computing device also may provide access to the obtained enterprise data via the managed browser (e.g., by causing some or all of the obtained enterprise data to be displayed in the managed browser).

In some embodiments, one or more policies may be applied to the managed browser. In addition, the one or more policies may be configured to limit at least one function of the managed browser. For example, the one or more policies may define certain circumstances in which certain function(s) of the managed browser are to be selectively disabled, and the computing device may detect and/or otherwise identify these circumstances (e.g., based on device state information, as discussed below) and subsequently disable the function(s) in accordance with the one or more policies. Some examples of the functions of the managed browser that may be limited by a policy in some instances include cut-and-paste functions, instant messaging functions, and video chat functions. While these functions are listed here as examples of the functions that may be limited in some instances, other functions may be similarly limited in other instances.

In some embodiments, one or more policies may be applied to the managed browser, and at least one policy of the one or more policies may be configured to limit usage of the obtained enterprise data. For example, the one or more policies may define certain circumstances in which the enterprise data (e.g., the enterprise data obtained via the application tunnel(s) by the computing device and/or the managed browser in step 520) can only be used in certain ways, and the computing device may detect and/or otherwise identify these circumstances (e.g., based on device state information, as discussed below) and subsequently restrict and/or otherwise control the way(s) in which the data can be used in accordance with the one or more policies. For instance, at least one policy of the one or more policies may be configured to limit the circumstances in which the obtained enterprise data can be copied and pasted (e.g., from the managed browser into another application). As another example, at least one policy of the one or more policies may be configured to limit the circumstances in which the obtained enterprise data can be saved or printed (e.g., by the managed browser and/or by the computing device).

In some embodiments, at least one policy of the one or more policies may depend on device state information. For example, the limit(s) on the function(s) of the managed browser (e.g., as imposed by the one or more policies) and/or the limit(s) on the way(s) in which enterprise data may be used by the managed browser (e.g., as additionally or alternatively imposed by the one or more policies) may be depend on state information that is indicative of the current state of the computing device. Such state information may, for instance, be collected and/or monitored by a mobile resource management (MRM) agent that is configured to run on the computing device (e.g., as a background application, service, or process) and which may, for instance, incorporate one or more aspects of client agent 404 (discussed above). The MRM agent may, for instance, provide and/or be configured to provide mobile device management (MDM) functionalities, mobile application management (MAM) functionalities, and/or other functionalities. For example, the MRM agent may be configured to collect and/or monitor device-level state information, such as state information that is indicative of the operating systems and/or applications that are stored on and/or running on the device, state information that is indicative of the network connections that are available to and/or being used by the device, and/or state information that is indicative of the current location of where the device is located and/or being used (e.g., in terms of geographic coordinates; in terms of semantic labels, such as "home" or "work;" etc.). While these types of state information are listed here as examples of the types of state information that may be collected and/or monitored (e.g., by the MRM agent, by one or more other applications or services or processes on the computing device, etc.) in some instances, additional and/or alternative types of state information may be similarly collected and/or monitored in other instances. In addition, any and/or all of this state information may be used (e.g., by the computing device and/or by the managed browser) in applying and/or enforcing policies on the managed browser, such as the policies discussed above.

Figure 6:
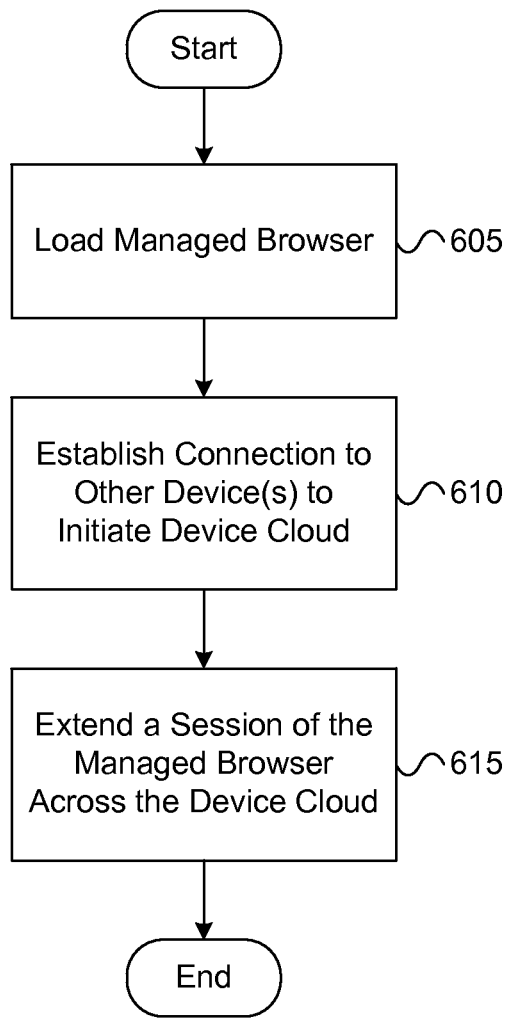
FIG. 6 depicts a flowchart that illustrates a method of extending a managed browser session across a device cloud in accordance with one or more illustrative aspects discussed herein.

FIG. 6 depicts a flowchart that illustrates a method of extending a managed browser session across a device cloud in accordance with one or more illustrative aspects discussed herein. In one or more embodiments, the method illustrated in FIG. 6 and/or one or more steps thereof may be performed by a computing device (e.g., generic computing device 201). In other embodiments, the method illustrated in FIG. 6 and/or one or more steps thereof may be embodied in computer-executable instructions that are stored in a computer-readable medium, such as a non-transitory computer-readable memory.

As seen in FIG. 6, the method may begin at step 605 in which a managed browser may be loaded. For example, in step 605, a computing device (e.g., a mobile computing device, such as a laptop computer, tablet computer, smart phone, or other type of mobile device) may load a managed browser, similar to how such a managed browser may be loaded in step 505 (discussed above). The managed browser may, for instance, be configured to provide at least one managed mode in which one or more policies are applied to the managed browser, and the one or more policies may be configured to limit one or more functions of the managed browser, as discussed above. Additionally, the managed browser may, in some embodiments, be configured to provide secure browsing and caching of data obtained from at least one enterprise resource.

In step 610, a connection to at least one other computing device may be established to initiate a device cloud. For example, in step 610, the computing device may establish a network connection to one or more other computing devices to initiate a device cloud. In one or more arrangements, a device cloud may, for instance, enable two or more computing devices to be used in combination with each other to perform a single function or task. In typical instances, the devices may be used by the same user and/or both may be located near each other (e.g., within a predetermined distance of each other) and/or near the user (e.g., within a predetermined distance of the user). In some instances, a device cloud may be used to provide a function that is not supported by one of the user's devices, but is supported by another one of the user's devices. For example, a user of a laptop computer may wish to conduct a video conference with another person, but the laptop computer might not include a camera. If the user also has a smart phone (or other computing device) that includes a camera, however, a device cloud may be used to dynamically link the functionalities provided by the two devices so that they may be used in providing the video conference. In particular, in this example, a device cloud may be established such that the user's smart phone may be used as a video input device for the video conference (which may, e.g., be facilitated by a video conferencing plug-in, applet, web application, etc. that may be running within the managed browser), while the user's laptop computer can be used to perform other functions that may be involved in conducting the video conference (e.g., establishing the connection to the other person's device(s), providing text-based chat functionalities, etc.). While this example illustrates some ways in which a device cloud may be used to extend the functionalities of one or more devices in some embodiments, such a device cloud may be used in other ways to extend additional and/or alternative functionalities of various devices in other embodiments.

In step 615, a session of the managed browser may be extended across the device cloud. For example, in step 615, the computing device may extend a session of the managed browser (e.g., a current session of the managed browser with which a user of the computing device is interacting) across the device cloud (e.g., the device cloud created in step 610). In one or more arrangements, extending the session of the managed browser across the device cloud may include causing at least one other managed browser to be loaded on the at least one other computing device, and sharing session data with the at least one other managed browser. For example, in extending a session of the managed browser across the device cloud, the computing device may initially cause instance(s) of the managed browser to be loaded on the other device(s) participating in the device cloud. Subsequently, the computing device may share session data with the instance(s) of the managed browser that are running on the other device(s) participating in the device cloud. In sharing such session data, the computing device may, for instance, send some or all of the information that is currently being used and/or displayed by the managed browser on the computing device, which may include enterprise data and/or non-enterprise data. Additionally or alternatively, in sharing session data with the instance(s) of the managed browser that are running on the other device(s) participating in the device cloud, the computing device may receive information that may be subsequently displayed and/or otherwise used by the managed browser on the computing device.

In some embodiments, one or more policies may be applied to the managed browser, and the one or more policies may be configured to limit at least one function of the managed browser. For example, the computing device and/or software running on the computing device (such as an MRM agent) may apply one or more policies to the managed browser that are configured to limit function(s) of the managed browser, as discussed above.

In some embodiments, one or more policies may be applied to the managed browser, and the one or more policies may be configured to limit the device cloud. For example, the computing device and/or software running on the computing device (such as an MRM agent) may, in some instances, apply one or more policies to the managed browser that are configured limit various aspects of the device cloud (e.g., the device cloud created in step 610). In some instances in which the one or more policies are configured to limit the device cloud, at least one policy of the one or more policies may be configured to allocate at least one role to the at least one other computing device. For example, in instances in which the one or more policies are configured to limit the device cloud, the computing device and/or the software running on the computing device may define, apply, and/or enforce at least one policy that is configured to allocate particular role(s) in the device cloud to the other computing device(s) that are participating in the device cloud. For instance, in the example discussed above involving a video conference, the mobile device management policies may allocate a video capturing role to the smart phone involved in the device cloud, and the mobile device management policies may allocate a connection maintenance role to the laptop computer involved in the device cloud.

In some embodiments, the connection to the at least one other computing device may be established based on at least one policy of the one or more policies that may be applied to the managed browser. For example, in establishing the connection to the at least one other computing device, the managed browser and/or the computing device on which the managed browser is running may connect to and/or exchange data with the at least one other computing device in accordance with one or more policies that may be applied to the managed browser. For instance, the one or more policies may define certain circumstances in which the managed browser's ability to initiate the device cloud may be selectively enabled, selectively disabled, and/or otherwise restricted. For example, at least one policy of the one or more policies may selectively restrict the types of information that can be exchanged with the other computing device(s), the users that can access information exchanged with the other computing device(s), the times at which the managed browser can exchange information with the other computing device(s), the locations at which the managed browser can exchange information with the other computing device(s), and/or other may impose other restrictions. Any and/or all of these restrictions may limit the circumstances in which the computing device can establish a connection to the at least one other computing device and/or may otherwise limit the circumstances in which the device cloud can be initiated.

In some embodiments, establishing the connection to the at least one other computing device may include evaluating state information associated with the at least one other computing device, and determining, based on the evaluated state information, to allow the at least one other computing device to participate in the device cloud. For example, in establishing the connection to the at least one other computing device (e.g., in step 610), the computing device may obtain and/or evaluate state information associated with the at least one other computing device. Such state information may, for instance, describe various aspects of the current device state of the at least one other computing device, such as the applications that may be installed and/or running on the at least one other computing device, the networks to which the at least one other computing device is connected to, the location of the at least one other computing device, and/or other considerations. Subsequently, the computing device may determine, based on evaluating this state information, whether to allow the at least one other computing device to participate in the device cloud. Such a determination may, for instance, be based on one or more policies. For example, one or more policies may dictate that the computing device may allow the at least one other computing device to participate in the device cloud if the state information associated with the at least one other computing device indicates that the device is or is not located in a certain location, does or does not have certain applications installed and/or running on the device, is or is not connected to one or more specific networks, and/or the like.

Figure 7:
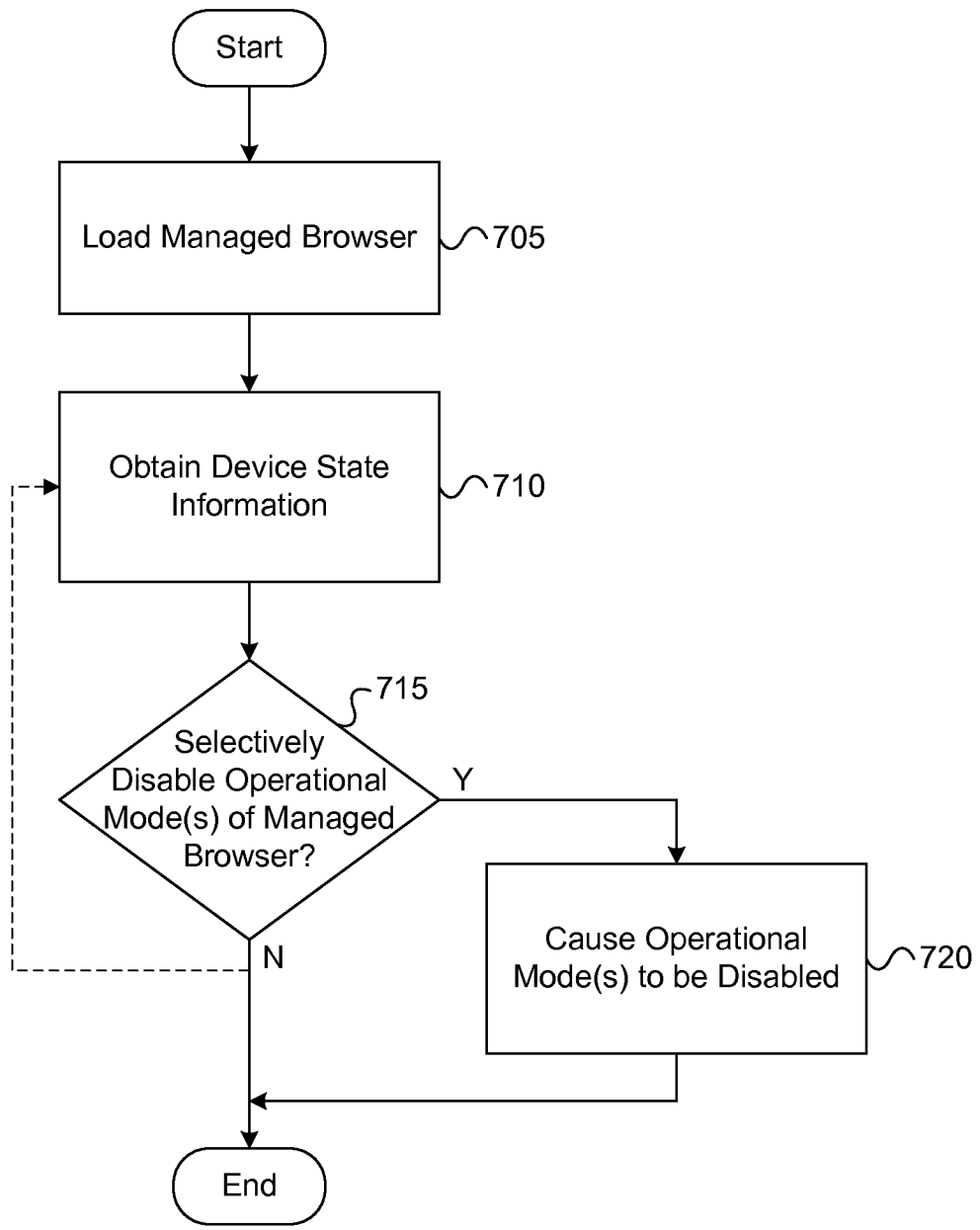
FIG. 7 depicts a flowchart that illustrates a method of selectively disabling an operational mode of a managed browser in accordance with one or more illustrative aspects discussed herein.

FIG. 7 depicts a flowchart that illustrates a method of selectively disabling an operational mode of a managed browser in accordance with one or more illustrative aspects discussed herein. In one or more embodiments, the method illustrated in FIG. 7 and/or one or more steps thereof may be performed by a computing device (e.g., generic computing device 201). In other embodiments, the method illustrated in FIG. 7 and/or one or more steps thereof may be embodied in computer-executable instructions that are stored in a computer-readable medium, such as a non-transitory computer-readable memory.

As seen in FIG. 7, the method may begin at step 705 in which a managed browser may be loaded. For example, in step 705, a computing device (e.g., a mobile computing device, such as a laptop computer, tablet computer, smart phone, or other type of mobile device) may load a managed browser, similar to how such a managed browser may be loaded in step 505 (discussed above). The managed browser may, for instance, be configured to provide at least one managed mode in which one or more policies are applied to the managed browser, and the one or more policies may be configured to limit one or more functions of the managed browser, as discussed above. Additionally, the managed browser may, in some embodiments, be configured to provide secure browsing and caching of data obtained from at least one enterprise resource.

In one or more arrangements, the managed browser may be a dual-mode application that has a managed mode and an unmanaged mode. In addition, the managed mode of the managed browser may be configured to provide access to enterprise data, and the unmanaged mode of the managed browser may be configured to limit access to enterprise data. For example, in the managed mode, the managed browser may apply specific content filters, restrict specific downloads, and/or block specific plug-ins, whereas in the unmanaged mode, the managed browser might not apply such filters, restrict such downloads, and/or block such plug-ins. In some instances, the computing device and/or other software running on the computing device (e.g., an MRM agent) may selectively disable the managed mode of the managed browser, as discussed below, such that the managed browser might only be able to run and/or continue running in the unmanaged mode (e.g., until the managed mode of the managed browser is re-enabled by the computing device and/or by the other appropriate software running on the computing device).

In step 710, device state information may be obtained. For example, in step 710, the computing device may obtain state information that is indicative of the current state of the computing device. In some instances, such state information may be obtained by an MRM agent running on the computing device, such as the MRM agent discussed in the examples above.

In some embodiments, the device state information may include information identifying one or more applications that are present on the computing device. For example, in obtaining device state information (e.g., in step 710), the computing device and/or the MRM agent running on the computing device may inspect one or more storage devices (which may, e.g., be connected to and/or otherwise accessible to the computing device) and/or installation logs (which may, e.g., be maintained by the computing device) to determine what application(s) are stored on the computing device, installed on the computing device, previously run on the computing device, and/or currently running on the computing device.

In some embodiments, the device state information may include information identifying one or more network connections that are used by the computing device. For example, in obtaining device state information (e.g., in step 710), the computing device and/or the MRM agent running on the computing device may inspect one or more network interfaces and/or other network devices (which may, e.g., be connected to and/or otherwise usable by the computing device) and/or one or more connection logs (which may, e.g., be maintained by the computing device) to determine what network(s) are accessible to and/or in range of the computing device, what network(s) that computing device has previously connected to, and/or what network(s) the computing device is currently connected to.

In some embodiments, the device state information may include information identifying a current location of the computing device. For example, in obtaining device state information (e.g., in step 710), the computing device and/or the MRM agent running on the computing device may determine and/or cause one or more other components (e.g., a GPS receiver, other positioning components, etc.) and/or devices to determine a current position of the computing device. In some instances, the location information may include geographic coordinates that are indicative of the current position of the computing device. In some instances, the location information may include semantic labels that are indicative of the current position of the computing device relative to one or more user-specific landmarks (e.g., "home" or "work"). Any and/or all of this location may, for instance, be used by the computing device and/or by the MRM agent running on the computing device in applying and/or enforcing one or more location-based mobile device management policies.

In step 715, it may be determined, based on the device state information, whether to selectively disable one or more operational modes of the managed browser. For example, in step 715, the computing device may determine, based on the device state information obtained in step 710, whether to selectively disable one or more operational modes of the managed browser. As discussed above, the managed browser may, in some instances, be a dual-mode application that has a managed mode and an unmanaged mode. Thus, in some instances, the computing device may, in step 715, determine whether to selectively disable the managed mode of the managed browser based on the device state information obtained in step 710. For example, the computing device may determine whether to selectively disable the managed mode of the managed browser based on information identifying one or more applications that are present on the computing device, information identifying one or more network connections that are used by the computing device, and/or information identifying a current location of the computing device. In some instances, the computing device may additionally or alternatively evaluate one or more policies in combination with the device state information in determining whether to selectively disable a mode of the managed browser (e.g., the managed mode of the managed browser).

If it is determined, in step 715, not to disable one or more operational modes of the managed browser, then the method may end. Additionally or alternatively, the method may continue in a loop, such that steps 710 and 715 may be periodically repeated (e.g., to obtain updated device state information and/or reevaluate the updated device state information to determine whether to selectively disable one or more operational modes of the managed browser).

On the other hand, if it is determined, in step 715, to selectively disable at least one operational mode of the managed browser, then in step 720, the at least one operational mode of the managed browser may be disabled. For example, in step 720, the computing device may disable the at least one operational mode of the managed browser (e.g., the mode(s) determined to be disabled in step 715) and/or cause the at least one operational mode of the managed browser to be disabled. In instances in which the managed browser is a dual-mode application that has a managed mode and an unmanaged mode, the managed mode may, for example, be disabled by the computing device (and/or be caused to be disabled by the computing device) in step 720.

In some embodiments, causing the at least one managed mode to be disabled may include causing the managed browser to enter a second mode different from the at least one managed mode. For example, in disabling the managed mode of the managed mode of the managed browser and/or otherwise causing the managed mode of the managed browser to be disabled (e.g., in step 720), the computing device may cause the managed browser to enter a second mode that is different from the managed mode that the managed browser was previously operating in. In some instances, the second mode may be another managed mode that is simply different from the managed mode that the managed browser was previously operating in (e.g., because different policies are applied to the managed browser). In other words, the second mode may, in some instances, be a managed mode in which a second set of one or more policies is applied to the managed browser, where the second set of one or more policies includes at least one policy different from the one or more policies that are applied to the managed browser in the at least one managed mode.

In other instances, the second mode (which, e.g., the managed browser may enter after the at least one managed mode is disabled) may be an unmanaged mode in which the managed browser is no longer managed by at least one device manager. For example, in disabling the managed mode of the managed browser and/or otherwise causing the managed mode of the managed browser to be disabled (e.g., in step 720), the computing device may cause the managed browser to enter an unmanaged mode, such as the unmanaged mode discussed above, in which the managed browser might not be managed by at least one device manager. Such a device manager may, for instance, be a mobile resource management agent that is running on the device and is configured to apply and/or enforce one or more policies on the managed browser and/or other applications, services, and/or functions of the device.

In some embodiments, access to one or more resources may be blocked in the unmanaged mode. For example, after entering the unmanaged mode, the managed browser and/or the computing device may block access to specific resources, such as specific enterprise resources. Such block may, for instance, prevent a user of the managed browser from accessing enterprise resources and/or other specific resources while the managed browser is operating in an unmanaged mode in which policy enforcement, monitoring, and/or other security features might not be applied and/or available to ensure the security of enterprise information that might otherwise be accessed using the managed browser. In addition to blocking access to remotely stored information in remote enterprise resources, the managed browser and/or the computing device also may, in the unmanaged mode, block access to specific information that may be cached locally on the device. For example, during the unmanaged mode, such blocking may prevent the managed browser from accessing locally-cached data that was originally obtained from enterprise resources, such as locally-cached enterprise application store information and/or other locally-cached enterprise information.

In some embodiments, the managed browser may be configured to transition from the unmanaged mode back to the at least one managed mode based on updated device state information. For example, after entering the unmanaged mode, the managed browser and/or the computing device may be configured to monitor and periodically reevaluate current device state information to determine whether the managed browser can reenter the managed mode (e.g., in which one or more policies may be applied to the managed browser, the managed browser may be managed by the device manager, etc.). If, for instance, the managed browser and/or the computing device determines that specific circumstances are satisfied, for instance, based on the state information, the computing device may cause the managed browser to switch back to the managed mode. In some instances, in determining whether the managed browser can reenter the managed mode, the computing device and/or the managed browser may, for instance, evaluate the current device state information in view of one or more policies, which may include the one or more policies that were evaluated in determining to switch the managed browser to the unmanaged mode in the first place.

Figure 8:
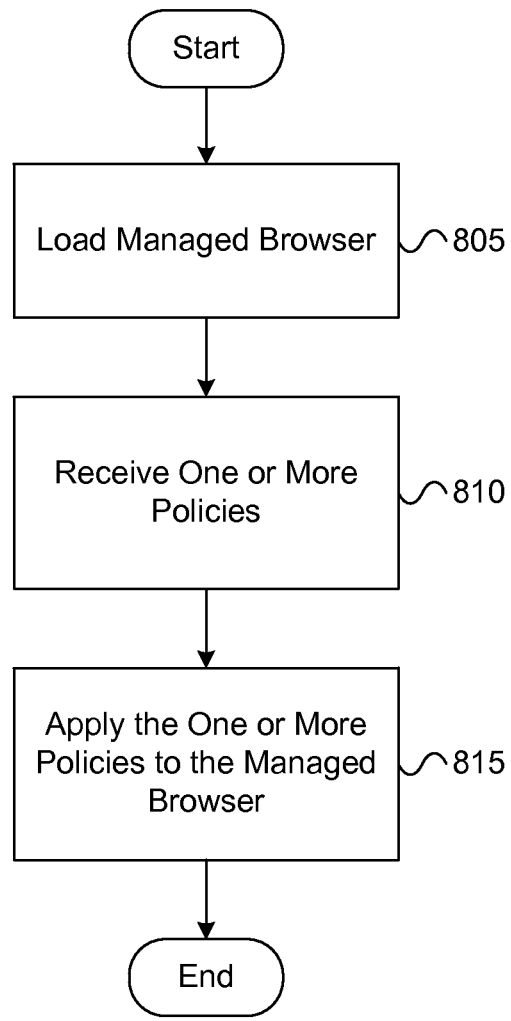
FIG. 8 depicts a flowchart that illustrates a method of applying one or more mobile device management policies to a managed browser in accordance with one or more illustrative aspects discussed herein.

FIG. 8 depicts a flowchart that illustrates a method of applying one or more mobile device management policies to a managed browser in accordance with one or more illustrative aspects discussed herein. In one or more embodiments, the method illustrated in FIG. 8 and/or one or more steps thereof may be performed by a computing device (e.g., generic computing device 201). In other embodiments, the method illustrated in FIG. 8 and/or one or more steps thereof may be embodied in computer-executable instructions that are stored in a computer-readable medium, such as a non-transitory computer-readable memory.

As seen in FIG. 8, the method may begin at step 805 in which a managed browser may be loaded. For example, in step 805, a computing device (e.g., a mobile computing device, such as a laptop computer, tablet computer, smart phone, or other type of mobile device) may load a managed browser, similar to how such a managed browser may be loaded in step 505 (discussed above). The managed browser may, for instance, be configured to provide at least one managed mode in which one or more policies are applied to the managed browser, and the one or more policies may be configured to limit one or more functions of the managed browser, as discussed above. Additionally, the managed browser may, in some embodiments, be configured to provide secure browsing and caching of data obtained from at least one enterprise resource.

In step 810, one or more policies may be received. For example, in step 810, the computing device may receive one or more policies. The one or more policies may, for instance, be mobile device management policies that define permitted, prohibited, and/or restricted functions based on different sets of circumstances that may be evaluated using device state information (e.g., device state information that is obtained and/or monitored by the computing device and/or by an MRM agent running on the computing device). Thus, the policies may be used in enforcing device-state-based behavior limitations on various functions, including various functions of the managed browser.

In some embodiments, the one or more policies may be received from a policy server. For example, in receiving the policies, the computing device may, in step 810, connect to and/or receive a number of policies from a policy server. The policy server may, for instance, be part of an enterprise network infrastructure, and may be connected to and/or included in one or more enterprise resources that may be accessed by the managed browser in accordance with the policies that are received (e.g., by the computing device in step 810).

In step 815, the one or more policies may be applied to the managed browser. For example, in step 815, the computing device may application the one or more policies (e.g., as received in step 810) to the managed browser, such that certain functions of the managed browser may be selectively enabled and/or disabled (e.g., based on device state information being obtained and/or monitored by the computing device and/or by an MRM agent running on the computing device).

In some embodiments, the one or more policies may be applied to the managed browser based on identity information associated with a user of the computing device. For example, in applying the one or more policies to the managed browser (e.g., in step 815), the computing device may request and/or obtain identity information associated with a current user of the computing device. Such identity information may, for instance, be obtained via one or more authentication prompts that are configured to prompt the user to provide his or her login information and/or other authentication credentials. By applying policies to the managed browser based on identity information, the specific functions that are selectively enabled, disabled, and/or restricted (e.g., by the one or more policies being applied to the managed browser) for the current user of the managed browser and/or the computing device may be more particularly tailored to the current user in view of their identity.

In some embodiments, the one or more policies may be applied to the managed browser based on role information associated with a user of the computing device. For example, in applying the one or more policies to the managed browser (e.g., in step 815), the computing device may request and/or obtain identity information and/or role information associated with a current user of the computing device. The role information may, for instance, specify the role(s) of the current user within the enterprise (e.g., sales, engineering, legal, accounting, executive, etc.). In some instances, the computing device may, for example, determine role information for the current user of the computing device based on identity information for the current user of the computing device (e.g., by using the identity information to access and/or look up role information for the user in one or more databases, directories, and/or enterprise resources). By applying policies to the managed browser based on role information, the specific functions that are selectively enabled, disabled, and/or restricted (e.g., by the one or more policies being applied to the managed browser) for the current user of the managed browser and/or the computing device may be more particularly tailored to the needs of and/or access level of the current user in view their role(s) within the enterprise.

For example, in applying one or more policies to the managed browser based on role information in the context of a healthcare enterprise, such as a hospital, the computing device may determine whether the current user of the computing device is a doctor or a nurse (e.g., by obtaining and/or analyzing identity information for the current user of the computing device). If the computing device determines that the current user of the computing device is a doctor, the computing device may apply a first set of policies to the managed browser, and if the computing device determines that the current user of the computing device is a nurse, the computing device may apply a second set of policies to the managed browser that is different from the first set of policies. In particular, the second set of policies may, for instance, selectively enable, disable, and/or restrict additional and/or alternative functions of the managed browser than the first set of policies, based on the differences between the nurse's role in the healthcare enterprise and the doctor's role in the healthcare enterprise. For example, as a result of the policies that are applied to the managed browser, the doctor may, for instance, be able to use the managed browser on the computing device to access specific resources that the nurse might not be able to access.

As another example, in applying one or more policies to the managed browser based on role information in the context of a legal enterprise, such as a law firm, the computing device may determine whether the current user of the computing device is an attorney or other professional within a group of professionals that has been screened from specific cases and/or other matters being handling by the law firm. If the computing device determines that the current user of the computing device is within the group of professionals that has been screened, then the computing device map apply a first set of policies to the managed browser, and if the computing device determines that the current user of the computing device is not within the group of professionals that has been screened, then the computing device may apply a second set of policies to the managed browser that is different from the first set of policies. In particular, the second set of policies may, for instance, selectively enable, disable, and/or restrict additional and/or alternative functions of the managed browser than the first set of policies, based on the differences between certain professionals' roles in the legal enterprise. For example, as a result of the policies that are applied to the managed browser, certain lawyers may be able to use the managed browser on the computing device to access specific resources that other lawyers within the law firm might not be able to access.

In some embodiments, applying the one or more policies to the managed browser may include controlling access to one or more enterprise resources that are accessible via the managed browser. For example, in applying the one or more policies to the managed browser (e.g., in step 815), the computing device may control access to the enterprise resource(s) that can be accessed using the managed browser. In particular, at least one policy of the one or more policies may, for instance, selectively enable, disable, and/or limit access to particular enterprise resource(s), such as particular databases, servers, and/or other enterprise resources (which may, e.g., be connected to and/or part of an enterprise infrastructure). Additionally or alternatively, such a policy may, for instance, depend on device state information (which may, e.g., include information identifying one or more applications that are present on the computing device, information identifying one or more network connections that are used by the computing device, and/or information identifying a current location of the computing device), such that access to particular enterprise resource(s) may be controlled based on the current state of the computing device.

In some embodiments, applying the one or more policies to the managed browser may include controlling use of information obtained from one or more enterprise resources via the managed browser. For example, in applying the one or more policies to the managed browser (e.g., in step 815), the computing device may control how information obtained from the enterprise resource(s), such as information obtained from the enterprise resource(s) using the managed browser, can be used (e.g., by the managed browser and/or by other applications, services, and/or processes on the computing device). In particular, at least one policy of the one or more policies may, for instance, selectively allow, prohibit, and/or otherwise restrict the ability to save information obtained from the enterprise resource(s), the ability to print information obtained from the enterprise resource(s), the ability to cut, copy, and/or paste information obtained from the enterprise resource(s), the ability to edit information obtained from the enterprise resource(s), and/or other abilities to interact with and/or use the information obtained from the enterprise resource(s). Additionally or alternatively, such a policy may, for instance, depend on device state information (which may, e.g., include information identifying one or more applications that are present on the computing device, information identifying one or more network connections that are used by the computing device, and/or information identifying a current location of the computing device), such that usage of particular information obtained from the enterprise resource(s) may be controlled based on the current state of the computing device.

Figure 9:
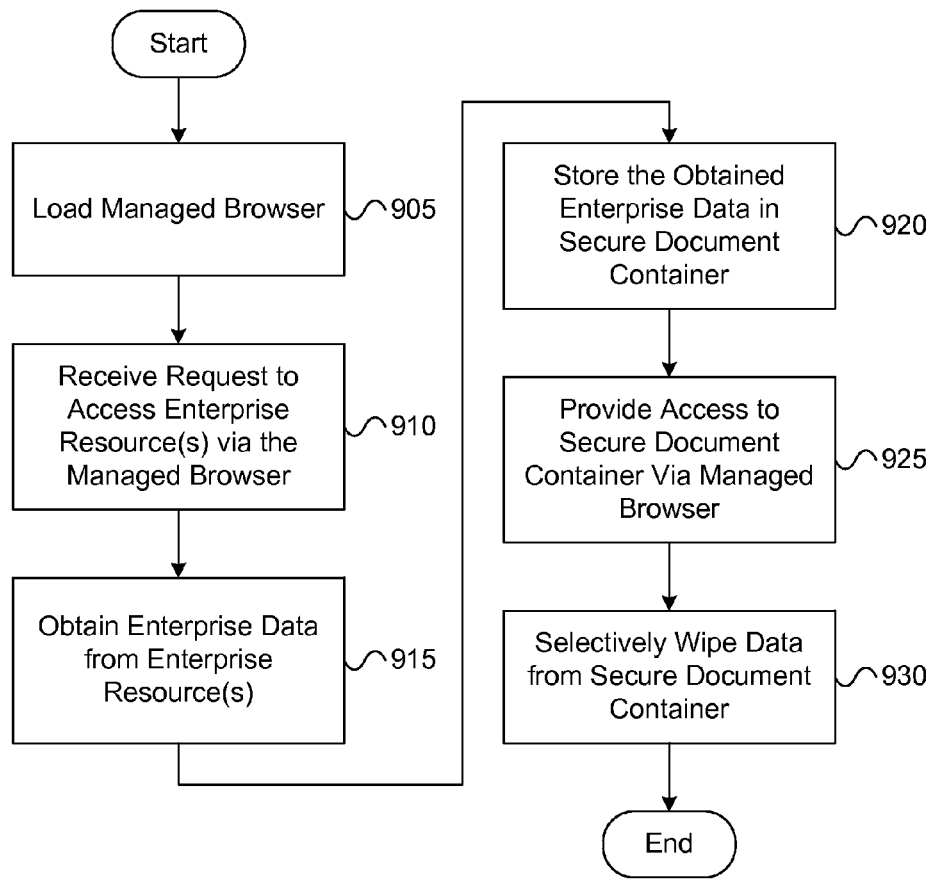
FIG. 9 depicts a flowchart that illustrates a method of providing access to a secure document container via a managed browser in accordance with one or more illustrative aspects discussed herein.

FIG. 9 depicts a flowchart that illustrates a method of providing access to a secure document container via a managed browser in accordance with one or more illustrative aspects discussed herein. In one or more embodiments, the method illustrated in FIG. 9 and/or one or more steps thereof may be performed by a computing device (e.g., generic computing device 201). In other embodiments, the method illustrated in FIG. 9 and/or one or more steps thereof may be embodied in computer-executable instructions that are stored in a computer-readable medium, such as a non-transitory computer-readable memory.

As seen in FIG. 9, the method may begin at step 905 in which a managed browser may be loaded. For example, in step 905, a computing device (e.g., a mobile computing device, such as a laptop computer, tablet computer, smart phone, or other type of mobile device) may load a managed browser, similar to how such a managed browser may be loaded in step 505 (discussed above). The managed browser may, for instance, be configured to provide at least one managed mode in which one or more policies are applied to the managed browser, and the one or more policies may be configured to limit one or more functions of the managed browser, as discussed above. Additionally, the managed browser may, in some embodiments, be configured to provide secure browsing and caching of data obtained from at least one enterprise resource.

In step 910, a request to access one or more enterprise resources via the managed browser may be received. For example, in step 910, the computing device may receive a request to access one or more enterprise resources via the managed browser. Such a request may, for instance, be based on and/or correspond to user input received by the computing device via the managed browser (e.g., based on a user selecting a link and/or otherwise requesting access to a network resource using the managed browser).

In step 915, enterprise data from the one or more enterprise resources may be obtained based on the request. For example, in step 915, the computing device may connect to, request, and subsequently receive and/or otherwise obtain information from the one or more enterprise resources based on the request received in step 910.

In step 920, the obtained enterprise data may be stored in a secure document container. For example, in step 920, the computing device may store the enterprise data obtained in step 915 in a secure document container. In one or more arrangements, the secure document container may be a data repository on the computing device that is configured to securely store enterprise data received by the computing device from one or more enterprise resources. Additionally or alternatively, one or more mobile device management policies may define certain circumstances in which access to the secure document container is to be restricted, modified, and/or otherwise controlled, and the computing device and/or an MRM agent running on the computing device may detect these circumstances based on device state information and subsequently restrict, modify, and/or otherwise control access to the secure document container in accordance with the policies. In other instances, other aspects of the secure document container (e.g., other than access to the secure document container) may be similarly controlled by one or more mobile device management policies.

In step 925, access to the secure document container may be provided via the managed browser. For example, in step 925, the computing device may provide access to the secure document container via the managed browser. In providing access to the secure document container via the managed browser, the computing device may, for instance, cause the managed browser to display and/or otherwise present one or more user interfaces that are configured to allow the enterprise data and/or other information stored in the secure document container to be viewed, edited, and/or otherwise accessed. For instance, in step 925, the computing device may cause the managed browser to display and/or otherwise present one or more user interfaces that allow a user of the computing device to browse the information stored in the secure document container, view particular files and/or other information stored in the secure document container, edit the information stored in the secure document container, delete the information stored in the secure document container, and/or otherwise interact with and/or access the information that is stored in the secure document container.

In step 930, data may be selectively wiped from the secure document container. For example, in step 930, the computing device may selectively wipe and/or otherwise delete information from the secure document container. In one or more arrangements, the computing device may selectively wipe data from the secure document container based on device state information, one or more policies, and/or other factors and/or circumstances that may be evaluated and/or detected by the computing device and/or by an MRM agent running on the computing device. In some instances, the computing device may wipe some data from the secure document container, such as the enterprise data obtained in step 915, while leaving other data, such as other data, including other enterprise data, which may be stored in the secure document container. In other instances, the computing device may wipe data from the secure document container that was received and/or stored during a certain time period (e.g., within the last four hours) while leaving other data (e.g., data that was received and/or stored during a different time period). In still other instances, the computing device may wipe data from the secure document container that was received and/or stored in connection with the managed browser and/or a particular session of the managed browser, while leaving other data (e.g., data that is associated with other applications and/or other session(s) of the managed browser).

In some embodiments, selectively wiping data from the secure document container may include deleting the enterprise data obtained from the one or more enterprise resources based on the request. For example, in selectively wiping data from the secure document container (e.g., in step 930), the computing device may delete the enterprise data obtained from the enterprise resource(s) in step 915. In deleting this enterprise data, the computing device may, for instance, delete the enterprise data obtained during the particular browsing session(s) in which the enterprise data was obtained, as well as any other information that may have been obtained during these browsing session(s), while leaving and/or otherwise preserving other data that may be stored in the secure document container (which, e.g., may have been obtained during other browsing session(s), may be associated with other application(s), etc.).

In some embodiments, data may be selectively wiped from the secure document container when the managed browser is closed. For example, the computing device may, in some instances, selectively wipe data from the secure document container in response to and/or otherwise based on the managed browser being closed (e.g., when a user of the computing device closes the managed browser, when a user of the computing devices closes a tab of the managed browser and/or otherwise closes a particular session of the managed browser, when the managed browser is closed or caused to be closed by another application, service, or process on the computing device, such as an MRM agent running on the computing device, etc.).

In some embodiments, data may be selectively wiped from the secure document container based on one or more policies. For example, the computing device may, in some instances, selectively wipe data from the secure document container based on one or more mobile device management policies. For instance, one or more mobile device management policies may define certain circumstances in which certain type(s) of data are to be selectively wiped from the secure document container, and the computing device and/or an MRM agent running on the computing device may detect these circumstances based on device state information and subsequently wipe data from the secure document container in accordance with the policies. For example, based on device state information (which may, e.g., include information identifying one or more applications that are present on the computing device, information identifying one or more network connections that are used by the computing device, and/or information identifying a current location of the computing device), the computing device and/or an MRM agent running on the computing device may selectively wipe enterprise data from the secure document container that was obtained from one or more enterprise resources using the managed browser (e.g., in step 915) and subsequently stored in the secure document container (e.g., in step 920).

In some embodiments, data may be selectively wiped from the secure document container based on the one or more policies that are applied to the managed browser when the managed browser is operating in the managed mode. For example, the computing device may, in some instances, selectively wipe data from the secure document container based on the one or more policies that are applied to the managed browser in the managed mode, and at least one such policy may define specific circumstances in which specific data (which may, e.g., have been obtained using the managed browser) should be selectively deleted from the secure document container. In addition, these specific circumstances may be detected by the computing device and/or by an MRM agent running on the computing device based on device state information, as in the examples discussed above.

Figure 10:
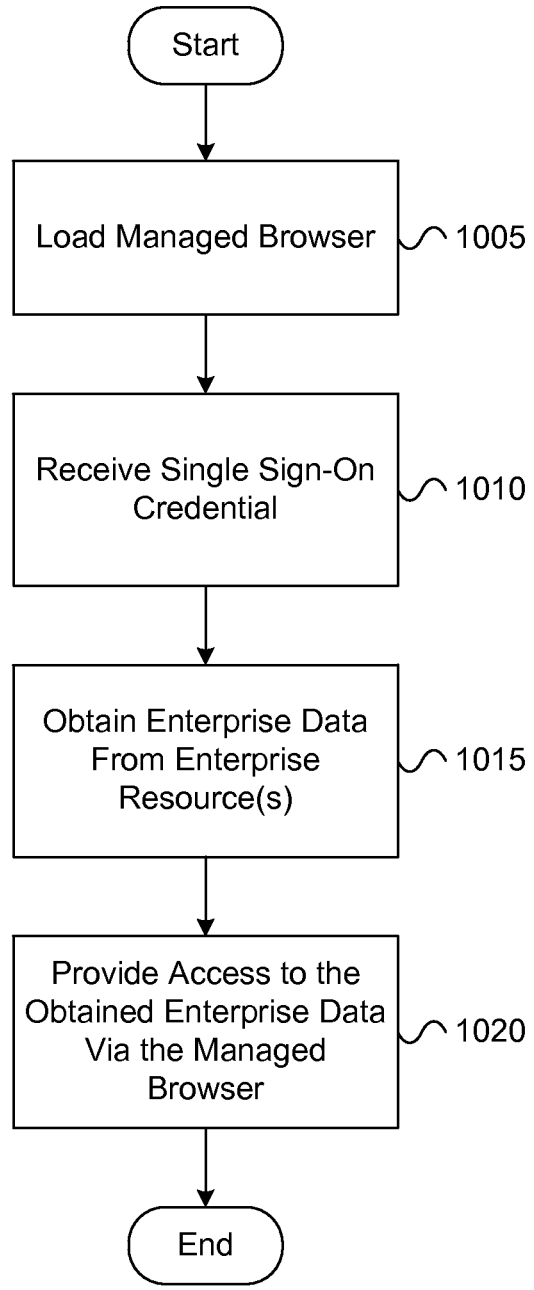
FIG. 10 depicts a flowchart that illustrates a method of obtaining enterprise data based on a single sign-on credential and providing access to the data via a managed browser in accordance with one or more illustrative aspects discussed herein.

FIG. 10 depicts a flowchart that illustrates a method of obtaining enterprise data based on a single sign-on credential and providing access to the data via a managed browser in accordance with one or more illustrative aspects discussed herein. In one or more embodiments, the method illustrated in FIG. 10 and/or one or more steps thereof may be performed by a computing device (e.g., generic computing device 201). In other embodiments, the method illustrated in FIG. 10 and/or one or more steps thereof may be embodied in computer-executable instructions that are stored in a computer-readable medium, such as a non-transitory computer-readable memory.

As seen in FIG. 10, the method may begin at step 1005 in which a managed browser may be loaded. For example, in step 1005, a computing device (e.g., a mobile computing device, such as a laptop computer, tablet computer, smart phone, or other type of mobile device) may load a managed browser, similar to how such a managed browser may be loaded in step 505 (discussed above). The managed browser may, for instance, be configured to provide at least one managed mode in which one or more policies are applied to the managed browser, and the one or more policies may be configured to limit one or more functions of the managed browser, as discussed above. Additionally, the managed browser may, in some embodiments, be configured to provide secure browsing and caching of data obtained from at least one enterprise resource.

In step 1010, a single sign-on (SSO) credential that is associated with at least one user account may be received. For example, in step 1010, the computing device may receive a single sign-on credential, and the single sign-on credential may be linked to and/or otherwise associated with a particular user of the computing device and/or a particular user account (which may, e.g., be utilized in accessing and/or using the computing device and/or other resources, such as enterprise resources and/or other network resources). In one or more arrangements, the single sign-on credential may be an authentication credential that is configured to be used in accessing at least two different enterprise resources (e.g., various enterprise websites, databases, servers, other resources, etc.). Additionally or alternatively, the single sign-on credential may be received when the user is logging into a user account on the computing device, logging into an application on the computing device, logging into a website being accessed via the computing device, interacting with an authentication prompt presented on the computing device, and/or in other ways. In some instances, the single sign-on credential may be received via the managed browser, for example, in connection with a request or attempt to access one or more enterprise resources and/or other resources or information using the managed browser.

In step 1015, enterprise data from one or more enterprise resources may be obtained based on the SSO credential. For example, in step 1015, the computing device may connect to, request, and subsequently receive and/or otherwise obtain information from one or more enterprise resources using the SSO credential received in step 1010. In some instances, the SSO credential may, for instance, be used in authenticating with the enterprise resources, requesting rights-controlled information from the enterprise resources, and/or otherwise receiving the enterprise data from the enterprise resources. For example, in obtaining enterprise data from one or more enterprise resources, the computing device may initiate a connection to a specific enterprise resource, which may challenge the managed browser to provide authentication information. In response to the challenge, the managed browser may provide the SSO credential (e.g., as received in step 1010) to the enterprise resource in order to authenticate with the enterprise resource and/or obtain information from the enterprise resource.

In step 1020, access to the obtained enterprise data may be provided via the managed browser. For example, in step 1020, the computing device may provide access to the enterprise data obtained in step 1015 via the managed browser. In providing access to the obtained enterprise data via the managed browser, the computing device may, for instance, cause the managed browser to display and/or otherwise present one or more user interfaces that are configured to allow the enterprise data to be viewed, edited, and/or otherwise accessed. For instance, in step 920, the computing device may cause the managed browser to display and/or otherwise present one or more user interfaces that allow a user of the computing device to browse the obtained enterprise data, view the obtained enterprise data, edit the obtained enterprise data, delete the obtained enterprise data, and/or otherwise interact with and/or access the obtained enterprise data.

In some embodiments, in obtaining enterprise data from the one or more enterprise resources based on the SSO credential, the computing device and/or the managed browser running on the computing device may, depending on one or more policies and/or device state information, respond to one or more authentication challenges (which may, e.g., be presented by one or more enterprise resources) using the SSO credential without user involvement. For instance, such an authentication challenge may be automatically addressed by the managed browser and/or the computing device using the SSO credential based on one or more policies and/or device state information. In addition, the specific authentication challenges and/or types of authentication challenges that may be automatically addressed in this manner may change depending on the one or more policies and/or the current context of the device (which may, e.g., be indicated by device state information, as in the examples discussed above).

Thus, in one or more embodiments, obtaining the enterprise data from the one or more enterprise resources based on the SSO credential (e.g., in step 1015) may include: receiving an authentication challenge from at least one enterprise resource of the one or more enterprise resources; determining, based on at least one policy of the one or more policies, whether to provide the SSO credential to the at least one enterprise resource in response to the authentication challenge; and based on determining to provide the SSO credential to the at least one enterprise resource in response to the authentication challenge, providing the SSO credential to the at least one enterprise resource. For example, in obtaining enterprise data from one or more enterprise resources using the SSO credential (e.g., in step 1015), the computing device and/or the managed browser running on the computing device may receive an authentication challenge from an enterprise resource (which the managed browser may, e.g., be attempting to access). Such an authentication challenge may, for instance, typically require a user to provide one or more authentication credentials in order to access the corresponding resource.

After receiving the authentication challenge, the computing device and/or the managed browser running on the computing device may determine, based on one or more policies, whether to provide the SSO credential to the enterprise resource to respond to the authentication challenge. For instance, the computing device and/or the managed browser may such a determination on one or more policies that define specific circumstances in which the managed browser can automatically respond to such an authentication challenge using the SSO credential. In addition, the computing device and/or the managed browser may evaluate these circumstances based on device state information, similar to how such device state information may be evaluated in the examples discussed above. If the computing device and/or the managed browser determines, in view of the one or more policies and/or the device state information, that the SSO credential can be provided to the enterprise resource to respond to the authentication challenge, then the computing device and/or the managed browser may provide the SSO credential to the enterprise resource. For instance, the computing device and/or the managed browser may send the SSO credential (which may, e.g., have been received in step 1010) to the enterprise resource in order to automatically respond to the authentication challenge, which in turn may enable the computing device and/or the managed browser to access information from and/or stored by the enterprise resource. In addition, the computing device and/or the managed browser may send the SSO credential in this way without user involvement. For example, the computing device and/or the managed browser may send the SSO credential without prompting the user to provide any authentication credentials and/or without even notifying the user that the SSO credential is being provided to the enterprise resource. Alternatively, if the computing device and/or the managed browser determines, in view of the one or more policies and/or the device state information, that the SSO credential cannot be provided to the enterprise resource to respond to the authentication challenge, then the computing device and/or the managed browser may prompt the user to provide one or more authentication credentials (which may then, e.g., be used by the computing device and/or the managed browser in responding to the authentication challenge). Thus, in one or more embodiments, based on determining not to provide the SSO credential to the at least one enterprise resource in response to the authentication challenge, the computing device and/or the managed browser running on the computing device may generate an authentication prompt that is configured to receive at least one authentication credential from a user of the computing device.

In some embodiments, providing access to the obtained enterprise data via the managed browser may include enforcing one or more policies based on the SSO credential. For example, in providing access to the obtained enterprise data and/or enforcing policies based on the SSO credential, the computing device may obtain one or more policies based on the SSO credential (e.g., by downloading, receiving, and/or otherwise obtaining one or more policies from a policy server and/or other enterprise resources based on the SSO credential), select applicable policies based on the SSO credential (e.g., by selectively activating, deactivating, and/or enforcing policies that are applicable to and/or appropriate for the current user of the computing device, in view of the identity information that may be associated with the SSO credential), and/or impose one or more behavior limitations on the managed browser in accordance with the policies (e.g., by enforcing behavior limitations on the managed browser that may be applicable to and/or appropriate for the identity and/or role of the user in view of the SSO credential, the one or more policies, and/or device state information).

In some embodiments in which one or more policies are enforced based on the SSO credential, the one or more policies may be configured to limit one or more functions of the managed browser. For example, the one or more policies may define certain circumstances in which certain function(s) of the managed browser are to be selectively disabled for certain users, and the computing device may detect and/or otherwise identify these circumstances (e.g., based on device state information) and subsequently disable the function(s) in accordance with the one or more policies and based on the SSO credential received in step 1010. As discussed above, some examples of the functions of the managed browser that may be limited by a policy in some instances include cut-and-paste functions, instant messaging functions, and video chat functions. In addition, while these functions are listed here as examples of the functions that may be limited in some instances, other functions may be similarly limited in other instances.

In some embodiments in which one or more policies are enforced based on the SSO credential, the one or more policies may be configured to limit access to the obtained enterprise data. For example, the one or more policies may define certain circumstances in which the enterprise data (e.g., the enterprise data obtained in step 1015) can only be accessed and/or used in certain ways, and the computing device may detect and/or otherwise identify these circumstances (e.g., based on device state information) and subsequently restrict and/or otherwise control the way(s) in which the data can be accessed and/or used in accordance with the one or more policies and based on the SSO credential received in step 1010. For instance, at least one policy of the one or more policies may be configured to limit the circumstances in which the obtained enterprise data can be copied and pasted (e.g., from the managed browser into another application). As another example, at least one policy of the one or more policies may be configured to limit the circumstances in which the obtained enterprise data can be saved or printed (e.g., by the managed browser and/or by the computing device).

In some embodiments in which one or more policies are enforced based on the SSO credential, enforcement of at least one policy of the one or more policies may depend on device state information. For example, the limit(s) on the function(s) of the managed browser (e.g., as imposed by the one or more policies) and/or the limit(s) on the way(s) in which enterprise data may be accessed and/or used by the managed browser (e.g., as additionally or alternatively imposed by the one or more policies) may be depend on state information that is indicative of the current state of the computing device. Such state information may, for instance, be collected and/or monitored by an MRM agent, as in the examples discussed above, that is configured to run on the computing device (e.g., as a background application, service, or process). For example, the MRM agent may be configured to collect and/or monitor device-level state information, such as state information that is indicative of the operating systems and/or applications that are stored on and/or running on the device, state information that is indicative of the network connections that are available to and/or being used by the device, and/or state information that is indicative of the current location of where the device is located and/or being used. In addition, any and/or all of this state information may be used (e.g., by the computing device and/or by the managed browser) in applying and/or enforcing policies on the managed browser, such as the policies discussed above, in combination with the SSO credential (which may, e.g., be received in step 1010, as discussed above).

Figure 11:
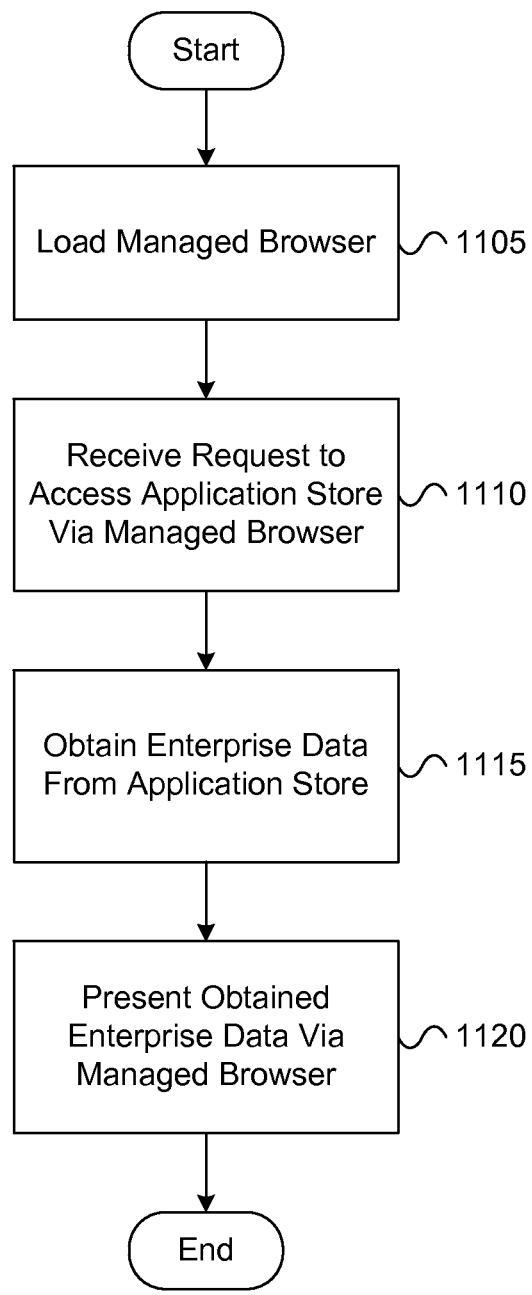
FIG. 11 depicts a flowchart that illustrates a method of providing access to an application store via a managed browser in accordance with one or more illustrative aspects discussed herein.

FIG. 11 depicts a flowchart that illustrates a method of providing access to an application store via a managed browser in accordance with one or more illustrative aspects discussed herein. In one or more embodiments, the method illustrated in FIG. 11 and/or one or more steps thereof may be performed by a computing device (e.g., generic computing device 201). In other embodiments, the method illustrated in FIG. 11 and/or one or more steps thereof may be embodied in computer-executable instructions that are stored in a computer-readable medium, such as a non-transitory computer-readable memory.

As seen in FIG. 11, the method may begin at step 1105 in which a managed browser may be loaded. For example, in step 1105, a computing device (e.g., a mobile computing device, such as a laptop computer, tablet computer, smart phone, or other type of mobile device) may load a managed browser, similar to how such a managed browser may be loaded in step 505 (discussed above). The managed browser may, for instance, be configured to provide at least one managed mode in which one or more policies are applied to the managed browser, and the one or more policies may be configured to limit one or more functions of the managed browser, as discussed above. Additionally, the managed browser may, in some embodiments, be configured to provide secure browsing and caching of data obtained from at least one enterprise resource.

In step 1110, a request to access an application store via the managed browser may be received. For example, in step 1110, the computing device may receive a request to access an application store via the managed browser. Such a request may, for instance, be based on and/or correspond to user input received by the computing device via the managed browser (e.g., based on a user selecting a link and/or otherwise requesting access to an application store using the managed browser). For example, the managed browser may include an icon or toolbar that may be configured to cause the application store to be displayed within the managed browser upon selection of the icon or toolbar. Additionally or alternatively, a specific policy that is applied to the managed browser may dynamically direct the browser to the correct application store based on one or more factors, such as the context (e.g., the state of the browser and/or various other programs that may be running on the device), user account information, and/or user role information.

In one or more arrangements, the application store (which, e.g., is requested to be accessed in step 1110) may be an enterprise application store that is configured to provide enterprise applications to one or more mobile computing devices. In addition to being configured to provide enterprise applications to various devices, the enterprise application store also may be configured to provide one or more mobile device management policies and/or policy updates to various devices. For instance, the application store may be configured to provide one or more applications that can be downloaded by one or more mobile computing devices and/or other user devices and that can subsequently be run natively on such user devices. The application store also may provide information that can be used to access one or more web applications and/or one or more virtualized applications. For example, the application store may provide a pointer and/or location information that can be used by the managed browser to locate and/or connect to a server that is running and/or otherwise configured to provide such a web application or virtualized application. In some instances, the pointer and/or location information may also be passed by the managed browser to a different application on the computing device to execute the web application or the virtualized application.

In step 1115, enterprise data from the application store may be obtained based on the request. For example, in step 1115, the computing device may connect to, request, and subsequently receive and/or otherwise obtain information from the application store based on the request received in step 1110.

In step 1120, at least part of the obtained enterprise data may be presented via the managed browser. For example, in step 1120, the computing device may present, via the managed browser, at least part of the enterprise data obtained from the application store in step 1115. In presenting the enterprise data via the managed browser, the computing device may, for instance, cause the managed browser to display and/or otherwise present one or more user interfaces that are configured to allow the enterprise data obtained from the application store to be viewed, interacted with, and/or otherwise accessed. For instance, in step 1120, the computing device may cause the managed browser to display and/or otherwise present one or more user interfaces that allow a user to view applications and/or other content available in the application store, select and/or download such applications and/or other content, and/or otherwise interact with application store data.

In some embodiments, presenting at least part of the obtained enterprise data may include causing an application download interface to be provided via the managed browser. For example, in presenting at least part of the enterprise data obtained from the application store, the computing device may display and/or cause the managed browser to display and/or otherwise present an application download interface. The application download interface may, for instance, include information about one or more applications that may be available for download via the application store and/or may include one or more links and/or other controls that are selectable to download the available application(s).

In some embodiments, presenting at least part of the obtained enterprise data may include providing access to at least one application from the application store, where the at least one application is only accessible via the managed browser. For example, in presenting at least part of the enterprise data obtained from the application store, the computing device may provide access to an application in the application store that is only available (e.g., for access, download, etc.) when the application store is accessed with the managed browser (e.g., and not with a conventional and/or non-managed browser). In some instances, certain types of information associated with a specific application (which may, e.g., be available in the application store and/or may have been obtained from the application store) might only be provided to a user device when the user device is accessing the application store via the managed browser. For example, access to enterprise templates, specific data sets, co-worker reviews, information about specific projects for which the application has been used, lists of other users and/or employees that have downloaded the application, and/or other types of information associated with a specific application might only be provided via the managed browser. This information may, for instance, be considered enterprise specific, and thus access to the information may be restricted through use of the managed browser.

In some embodiments, presenting at least part of the obtained enterprise data may include causing a virtualized session of at least one application to be provided via the managed browser. For example, in presenting at least part of the enterprise data obtained from the application store, the computing device may cause a virtualized session of an application to be provided via the managed browser. For instance, the computing device may cause the managed browser to display and/or otherwise provide one or more virtualized user interfaces of the application, which may be obtained from and/or remotely executed by the application store and/or one or more enterprise resources.

In some embodiments, the managed browser may be further configured to monitor device state information and enforce one or more policies based on the device state information. For example, in addition to being configured to present enterprise data obtained from the application store, the managed browser may be further configured to monitor device state information and enforce one or more policies (e.g., on the managed browser itself and/or on one or more other applications that may be running on the device). For instance, the managed browser may be configured to operate as and/or provide functionalities similar to the MRM agent discussed above, such that the managed browser may operate on the computing device not only as a browser that can securely access enterprise resources, but also as a mobile resource management agent that can monitor device state information and enforce policies on various applications and/or other functions of the device based on the state information.

Figure 12:
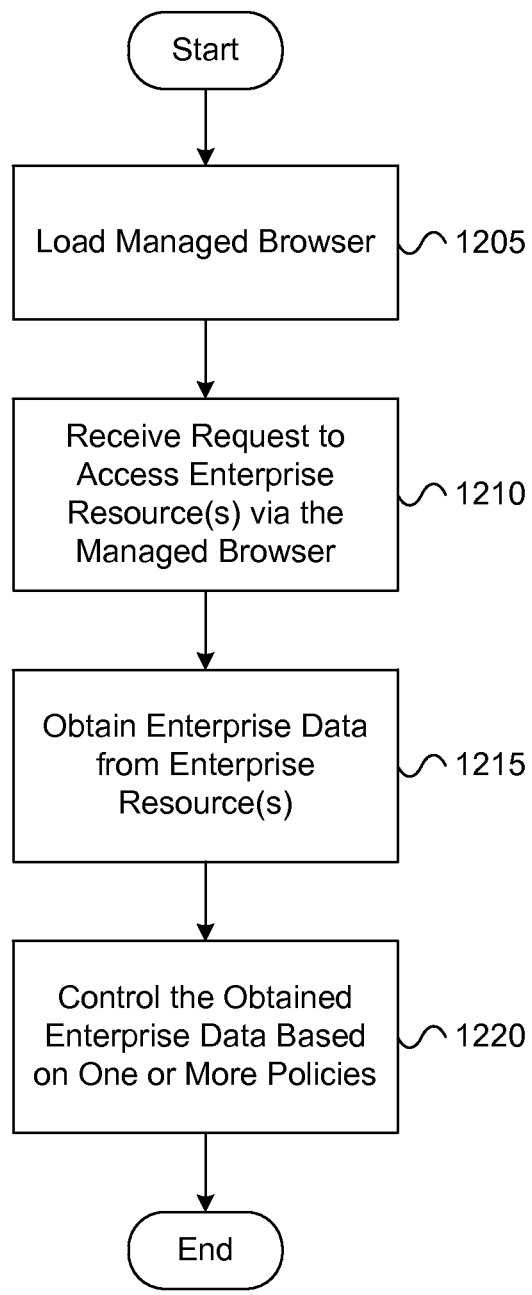
FIG. 12 depicts a flowchart that illustrates a method of obtaining and controlling enterprise data with a managed browser in accordance with one or more illustrative aspects discussed herein.

FIG. 12 depicts a flowchart that illustrates a method of obtaining and controlling enterprise data with a managed browser in accordance with one or more illustrative aspects discussed herein. In one or more embodiments, the method illustrated in FIG. 12 and/or one or more steps thereof may be performed by a computing device (e.g., generic computing device 201). In other embodiments, the method illustrated in FIG. 12 and/or one or more steps thereof may be embodied in computer-executable instructions that are stored in a computer-readable medium, such as a non-transitory computer-readable memory.

As seen in FIG. 12, the method may begin at step 1205 in which a managed browser may be loaded. For example, in step 1205, a computing device (e.g., a mobile computing device, such as a laptop computer, tablet computer, smart phone, or other type of mobile device) may load a managed browser, similar to how such a managed browser may be loaded in step 505 (discussed above). The managed browser may, for instance, be configured to provide at least one managed mode in which one or more policies are applied to the managed browser, and the one or more policies may be configured to limit one or more functions of the managed browser, as discussed above. Additionally, the managed browser may, in some embodiments, be configured to provide secure browsing and caching of data obtained from at least one enterprise resource.

In step 1210, a request to access one or more enterprise resources via the managed browser may be received. For example, in step 1210, the computing device may receive a request to access one or more enterprise resources via the managed browser. Such a request may, for instance, be based on and/or correspond to user input received by the computing device via the managed browser (e.g., based on a user selecting a link and/or otherwise requesting access to a network resource using the managed browser).

In step 1215, enterprise data from the one or more enterprise resources may be obtained based on the request. For example, in step 1215, the computing device may connect to, request, and subsequently receive and/or otherwise obtain information from the one or more enterprise resources based on the request received in step 1210.

In step 1220, the obtained enterprise data may be controlled based on one or more policies. For example, in step 1220, the computing device may control the enterprise data obtained in step 1215 using one or more mobile device management policies. The one or more mobile device management policies may, for instance, define certain circumstances in which certain functions (e.g., certain functions of the managed browser, certain functions involving the obtained enterprise data, etc.) may be allowed, prohibited, and/or otherwise restricted. Additionally or alternatively, the computing device may be configured to evaluate these circumstances based on device state information and subsequently control the enterprise data in accordance with the one or more policies. In some instances, the obtained enterprise data may be controlled using the same set of policies (e.g., a first set of policies) that may be applied to the managed browser in the managed mode. In other instances, the obtained enterprise data may be controlling using a different set of policies (e.g., a second set of policies different from the first set of policies) than may be applied to the managed browser in the managed mode.

In some embodiments, the policies that are used in controlling the enterprise data (e.g., in step 1220) may be specific to and/or grouped for one or more particular industries, such as healthcare, finance, law, engineering, and so on. By grouping and/or otherwise implementing policies in this manner, a cohesive group of industry-specific policies can be applied to the managed browser to create an industry-specific browser. For example, a cohesive group of healthcare-related policies may be applied to the managed browser to create a "healthcare browser" in which, for instance, the policies may operate to block certain functionality to meet regulatory and/or privacy concerns.

In some embodiments, the policies that are used in controlling the enterprise data (e.g., in step 1220) may include one or more policies that allow and/or cause logging functions and/or other monitoring functions to be selectively applied and/or executed. Such logging functions and/or other monitoring functions may be applied to the managed browser and/or to one or more other applications and/or services running on the computing device. For example, one or more policies may monitor and/or selectively filter network traffic during certain times, in certain locations, and/or based on the current context of the device. Additionally or alternatively, one or more policies may monitor and/or selectively filter network traffic based on user role information, performance information (which may, e.g., include device performance and/or network performance), and/or one or more other factors.

In some embodiments, controlling the obtained enterprise data may include controlling the managed browser with a mobile resource management (MRM) agent, such as a mobile resource management (MRM) agent, that is configured to apply at least one policy to at least one other application on the computing device. For example, in addition to being configured to control the managed browser (e.g., by applying and/or enforcing policies on the managed browser), an MRM agent that may be running on the computing device may be further configured to apply various mobile device management policies to other applications that are stored on and/or running on the computing device. Such an MRM agent may, for instance, incorporate one or more aspects of client agent 404 (discussed above).

In some embodiments, at least one policy of the one or more policies may be configured to selectively disable one or more functions of the managed browser based on device state information. Some examples of the functions of the managed browser that may be selectively disabled by such a policy in some instances include cut-and-paste functions, instant messaging functions, and video chat functions. While these functions are listed here as examples of the functions that may be selectively disabled in some instances, other functions may be similarly disabled in other instances. In addition, the device state information that may be used in evaluating the one or more policies may include information identifying one or more applications that are present on the computing device, information identifying one or more network connections that are used by the computing device, and/or information identifying a current location of the computing device, as in the examples discussed above.

In some embodiments, controlling the obtained enterprise data based on one or more policies may include controlling access to the obtained enterprise data. In addition, controlling access to the obtained enterprise data may, in some instances, include controlling use of the obtained enterprise data. For example, the one or more policies may define certain circumstances in which the enterprise data (e.g., the enterprise data obtained using the managed browser in step 1215) can only be accessed and/or used in certain ways, and the computing device may detect and/or otherwise identify these circumstances (e.g., based on device state information) and subsequently restrict and/or otherwise control the way(s) in which the data can be accessed and/or used in accordance with the one or more policies. For instance, at least one policy of the one or more policies may be configured to limit the circumstances in which the obtained enterprise data can be copied and pasted (e.g., from the managed browser into another application). As another example, at least one policy of the one or more policies may be configured to limit the circumstances in which the obtained enterprise data can be saved or printed (e.g., by the managed browser and/or by the computing device).

In some embodiments, the managed browser may be configured to receive one or more policy updates for the MRM agent from a policy management server. For example, the managed browser may, in some instances, receive one or more policy updates (which may, e.g., include new and/or updated policies to be applied to the managed browser, other applications, and/or other aspects of the computing device). Such policy updates may, for instance, be received from a policy management server, and after receiving such a policy update, the managed browser may provide the policy update and its associated information to the MRM agent (which may, e.g., then receive and apply the new and/or updated policies as appropriate).

In some embodiments, controlling the obtained enterprise data may include selectively blocking access to the obtained enterprise data when the managed browser is operating in an unmanaged mode. For example, after obtaining enterprise data from one or more enterprise resources (e.g., in step 1215), the managed browser and/or the computing device on which the managed browser is running may selectively block access to the obtained enterprise data when the managed browser is operating in an unmanaged mode (in which, e.g., one or more policies might not be applied to the browser, as discussed in the examples above). In other words, the managed browser and/or the computing device on which the managed browser is running may be configured such that a user of the computing device might only be able to access the obtained enterprise data with the managed browser while the managed browser is running in the managed mode, and may be prevented from accessing the obtained enterprise data via the managed browser while the managed browser is not running in the managed mode (e.g., when the managed browser is running in the unmanaged mode).

Figure 13:
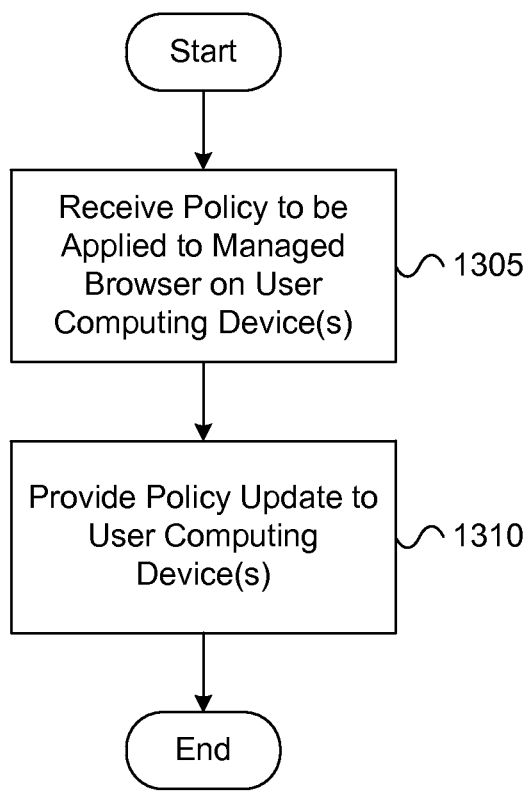
FIG. 13 depicts a flowchart that illustrates a method of administering one or more policies for a managed browser in accordance with one or more illustrative aspects discussed herein.

FIG. 13 depicts a flowchart that illustrates a method of administering one or more policies for a managed browser in accordance with one or more illustrative aspects discussed herein. In one or more embodiments, the method illustrated in FIG. 13 and/or one or more steps thereof may be performed by a computing device (e.g., generic computing device 201). In other embodiments, the method illustrated in FIG. 13 and/or one or more steps thereof may be embodied in computer-executable instructions that are stored in a computer-readable medium, such as a non-transitory computer-readable memory.

As seen in FIG. 13, the method may begin at step 1305 in which at least one policy to be applied to a managed browser on one or more user computing devices may be received. For example, such a policy may be received by a server computing device (which may, e.g., incorporate one or more aspects of generic computing device 201 and/or may be configured to provide policy management functionalities for an enterprise organization and/or its various users). In addition, the policy may be received by the server computing device from an administrative user and/or from a computing device being operated by such a user, who may be defining one or more new and/or updated policies to be applied to the managed browser(s) on various user computing devices. As in the examples discussed above, the managed browser may, for instance, be configured to provide at least one managed mode in which one or more policies are applied to the managed browser, and the one or more policies may be configured to limit one or more functions of the managed browser. Additionally, the managed browser may, in some embodiments, be configured to provide secure browsing and caching of data obtained from at least one enterprise resource.

In step 1310, at least one policy update may be provided to at least one user computing device of the one or more user computing devices based on the at least one policy. For example, in step 1315, the server computing device may provide a policy update to a user computing device based on the policy received in step 1305. In providing the policy update to a user computing device, the server computing device may, for instance, connect to, push, and/or otherwise send information to the user computing device about the new and/or updated policy, which may have been received by the server computing device in step 1305.

In one or more arrangements, the at least one policy update may be configured to cause the at least one user computing device to apply the at least one received policy to a managed browser on the at least one user computing device. For example, the policy update (which may, e.g., be provided by the server computing device to a user computing device in step 1310) may be configured to cause the user computing device to apply the policy (which may, e.g., be received by the server computing device in step 1305) to a managed browser on the user computing device. Such a managed browser may, for example, be running, stored, and/or otherwise present on the user computing device that receives the policy update from the server computing device (e.g., in step 1310). In some arrangements, the policy (which may, e.g., be received in step 1305 by the server computing device, and subsequently provided to and received by the user computing device via the policy update in step 1310) may define one or more specific rules that may be enforced on the managed browser and/or on the user computing device running the managed browser. Such rules may, for instance, be enforced in specific circumstances that may be defined in terms of and/or evaluated based on device state information (which may, e.g., include information about what other applications are running, installed on, and/or otherwise present on the user computing device; where the user computing device is located; what networks the user computing device is connected to; etc.)

In some embodiments, the at least one received policy may include one or more content filtering rules. For example, in some instances, the policy received by the server computing device in step 1305 may include one or more content filtering rules. Such a content filtering rule may, for instance, control a managed browser's ability to access specific network resources, which may include specific enterprise resources. For example, a content filtering rule may selectively block and/or selectively allow access to specific types of content by the managed browser based on device state information (which may, e.g., include information about what other applications are running, installed on, and/or otherwise present on the user computing device; where the user computing device is located; what networks the user computing device is connected to; etc., as discussed above) and/or other specific criteria.

In some embodiments, the at least one received policy may include one or more caching rules. For example, in some instances, the policy received by the server computing device in step 1305 may include one or more content caching rules. Such a content caching rule may, for instance, control a managed browser's ability to cache specific types of content, which may include specific types of content received from one or more enterprise resources, specific types of content received from other network resources (e.g., web content, cookies, etc.), and/or other types of information. For example, a content caching rule may selectively block and/or selectively allow caching of specific types of content by the managed browser based on device state information (which may, e.g., include information about what other applications are running, installed on, and/or otherwise present on the user computing device; where the user computing device is located; what networks the user computing device is connected to; etc., as discussed above) and/or other specific criteria.

In some embodiments, the at least one received policy may include one or more plugin rules. For example, in some instances, the policy received by the server computing device in step 1305 may include one or more plug-in management rules. Such a plug-in management rule may, for instance, control a managed browser's ability to access, execute, and/or otherwise use specific plug-ins (which may, e.g., include various types of applications, extensions, applets, scripts, and/or other types of plug-ins). For example, a plug-in management rule may selectively prevent and/or selectively enable access, execution, and/or use of one or more specific plug-ins by the managed browser based on device state information (which may, e.g., include information about what other applications are running, installed on, and/or otherwise present on the user computing device; where the user computing device is located; what networks the user computing device is connected to; etc., as discussed above) and/or other specific criteria.

In some embodiments, the at least one received policy may include one or more credential management rules. For example, in some instances, the policy received by the server computing device in step 1305 may include one or more credential management rules. Such a credential management rule may, for instance, control a managed browser's ability to use specific credentials, which may include one or more single sign-on (SSO) credentials, for instance, in accessing one or more resources. For example, a credential management rule may selectively prevent and/or enable access to and/or use of one or more specific credentials by the managed browser based on device state information (which may, e.g., include information about what other applications are running, installed on, and/or otherwise present on the user computing device; where the user computing device is located; what networks the user computing device is connected to; etc., as discussed above) and/or other specific criteria.

In some embodiments, the at least one received policy may be configured to be enforced by the at least one user computing device based on device state information. For example, in some instances, the policy received by the server computing device in step 1305 may be configured to be enforced by a user computing device based on device state information associated with the user computing device. Such a policy may, for instance, cause one or more specific functions to be executed and/or prevent one or more other specific functions from being executed based on state information associated with the user computing device. As discussed above, such state information may, for example, include information about what other applications (e.g., besides the managed browser) may be running, installed on, and/or otherwise present on the user computing device, information about where the user computing device is located, information about what networks the user computing device is connected to, and/or other information.

In some embodiments, the at least one received policy may include one or more rules that are configured to cause the managed browser to switch to an unmanaged mode based on one or more criteria. For example, in some instances, the policy received by the server computing device in step 1305 may include one or more rules that are configured to cause a managed browser on a user computing device to switch from a managed mode to an unmanaged mode based on one or more criteria. The one or more criteria may, for example, be based on and/or include device state information associated with the user computing device. As discussed above, such state information may, for example, include information about what other applications (e.g., besides the managed browser) may be running, installed on, and/or otherwise present on the user computing device, information about where the user computing device is located, information about what networks the user computing device is connected to, and/or other information.

Figure 14:
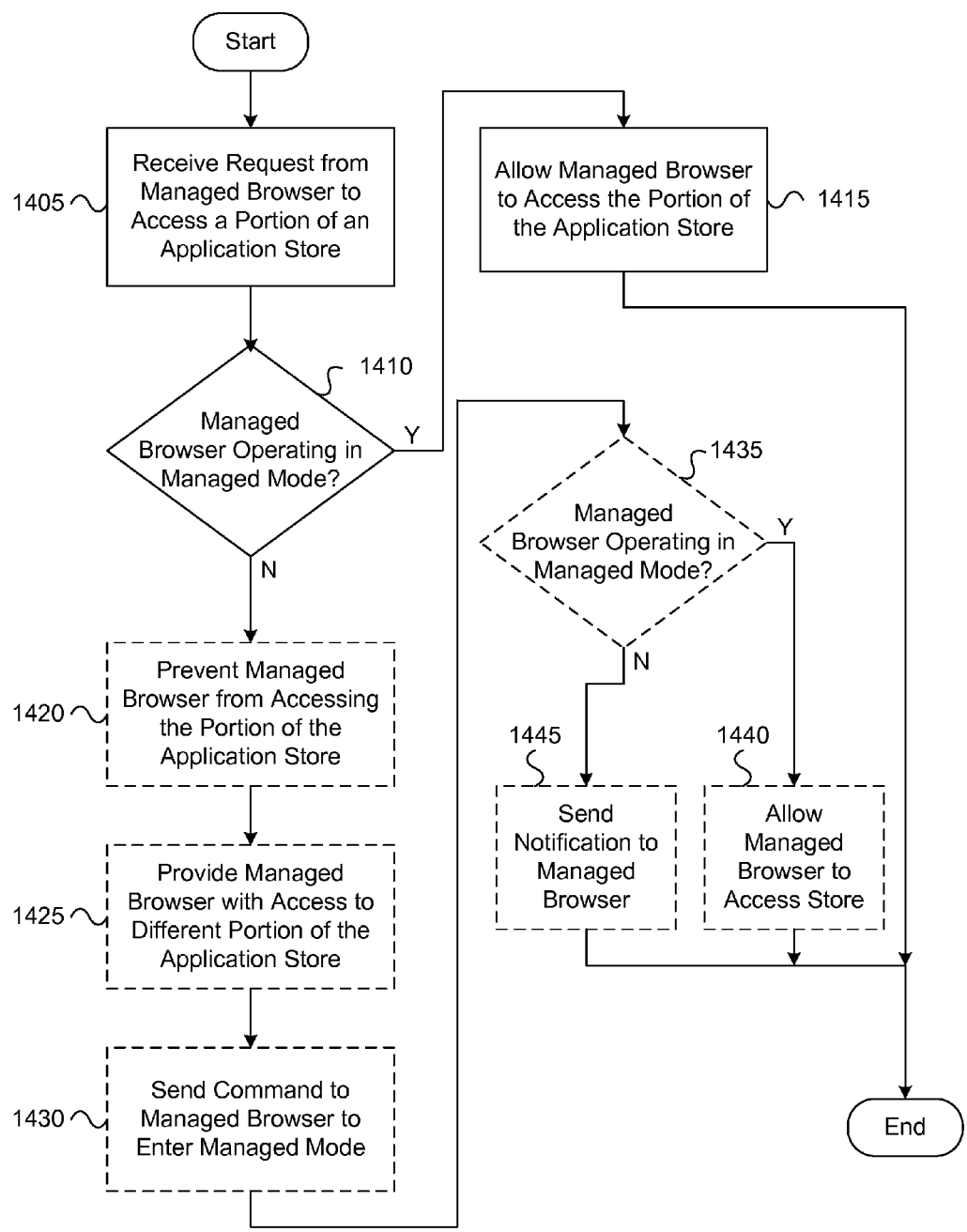
FIG. 14 depicts a flowchart that illustrates another method of providing access to an application store via a managed browser in accordance with one or more illustrative aspects discussed herein.

FIG. 14 depicts a flowchart that illustrates another method of providing access to an application store via a managed browser in accordance with one or more illustrative aspects discussed herein. In one or more embodiments, the method illustrated in FIG. 14 and/or one or more steps thereof may be performed by a computing device (e.g., generic computing device 201). In other embodiments, the method illustrated in FIG. 14 and/or one or more steps thereof may be embodied in computer-executable instructions that are stored in a computer-readable medium, such as a non-transitory computer-readable memory.

As seen in FIG. 14, the method may begin at step 1405 in which a request from a managed browser on a user computing device may be received, at an application store, to access a first portion of the application store. For example, in step 1405, a computing device that may provide an application store and/or be configured an application store, such as a server computing device that is configured to provide an enterprise application store, may receive a request from a managed browser on a user computing device to access a specific portion of the application store, such as a portion of the application store associated with specific applications and/or specific types of applications.

In step 1410, it may be determined, by the application store, whether the managed browser is operating in a managed mode in which one or more policies are applied to the managed browser, where the one or more policies being configured to limit at least one function of the managed browser. For example, in step 1410, the computing device may determine whether the managed browser running on the user computing device is running in a managed mode. For instance, the managed browser on the user computing device may provide and/or have a managed mode, similar to the managed mode(s) of the managed browser discussed in the examples above, for example, in which one or more policies are applied to the managed browser. In addition, the application store may determine whether the managed browser is operating in the managed mode by interrogating and/or otherwise exchanging information (which may, e.g., include device state information associated with the user computing device) with the managed browser to determine its current operating mode.

If it is determined, in step 1410, that the managed browser is operating in the managed mode, then in step 1415, the application store may allow the managed browser to access the first portion of the application store. For example, in step 1415, the computing device may provide the managed browser with access to the first portion of the application store (which may, e.g., include providing information associated with the first portion of the application, such as information associated with specific applications and/or specific types of applications, to the managed browser). In this way, the managed browser on the user computing device can access specific portions of the application store, such as the first portion of the application store in this example, while it is running in a managed mode, and as illustrated below, the managed browser might not be able to access specific portions of the application store when it is not running in a managed mode (e.g., when the browser is running in an unmanaged mode).

Thus, if it is determined, in step 1410, that the managed browser is not operating in the managed mode, then in step 1420, the application store may prevent the managed browser from accessing the first portion of the application store. For example, in step 1420, the computing device may prevent and/or block the managed browser (and/or the user computing device on which the managed browser is running) from accessing and/or otherwise obtaining information from the first portion of the application store.

Additionally or alternatively, in step 1425, the application store may provide the managed browser with access to a second portion of the application store different from the first portion of the application store. For example, after determining that the managed browser is not operating in the managed mode (e.g., in step 1410), the application store may, in step 1425, provide the managed browser with access to a different portion of the application store (e.g., than the portion that may have been originally requested by the managed browser and/or by the user of the managed browser).

Additionally or alternatively, in step 1430, the application store may send a command to the managed browser, and the command may be configured to cause the managed browser to enter a managed mode. For example, after determining that the managed browser is not operating in the managed mode (e.g., in step 1410), the application store may, in step 1430, send such a command to the managed browser. In sending such a command, the computing device providing the application store may, for instance, send and/or exchange data with the user computing device on which the managed browser is running. In addition, although the application store might send such a command, the managed browser on the user computing device might not enter the managed mode if, for instance, one or more policies and/or current device state information for the user computing device prevent the managed browser from entering the managed mode.

Thus, in step 1435, the application store may reevaluate whether the managed browser is operating in the managed mode after sending the command to the managed browser. For example, in step 1435, the application store may again interrogate and/or otherwise exchange information with the user computing device and/or the managed browser running on the user computing device, which may include obtaining and/or analyzing device state information from the user computing device.

If after the reevaluating in step 1435, it is determined that the managed browser is operating in the managed mode, then in step 1440, the application store may allow the managed browser to access the first portion of the application store. For example, in step 1440, the computing device may provide the managed browser with access to the first portion of the application store, similar to how the application store may provide such access in step 1415. Alternatively, if after the reevaluating in step 1435, it is determined that the managed browser is still not operating in the managed mode, then in step 1445, the application store may generate and/or send a notification to the managed browser, and such a notification may indicate that access to the first portion of the application store cannot be provided while the managed browser is not running in the managed mode. For example, in step 1445, the application store may send such a notification to the managed browser in hopes that the user of the managed browser may manually switch the managed browser into the managed mode and/or take other actions, which may alter the device state information and/or compliance with one or more policies, to allow the managed browser to enter the managed mode. Such actions may, for instance, include closing and/or deleting specific applications that may be on the user computing device besides the managed browser, moving the user computing device to another location different from the location at which the device is currently located, and/or connecting the user computing device to one or more other networks than the current network(s) to which the device may be currently connected.

Figure 15:
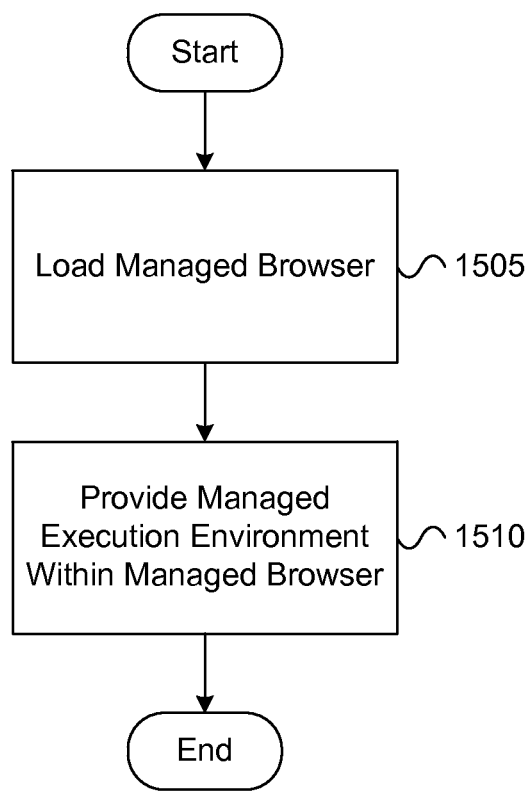
FIG. 15 depicts a flowchart that illustrates a method of providing a managed execution environment within a managed browser in accordance with one or more illustrative aspects discussed herein.

FIG. 15 depicts a flowchart that illustrates a method of providing a managed execution environment within a managed browser in accordance with one or more illustrative aspects discussed herein. In one or more embodiments, the method illustrated in FIG. 14 and/or one or more steps thereof may be performed by a computing device (e.g., generic computing device 201). In other embodiments, the method illustrated in FIG. 14 and/or one or more steps thereof may be embodied in computer-executable instructions that are stored in a computer-readable medium, such as a non-transitory computer-readable memory.

As seen in FIG. 15, the method may begin at step 1505 in which a managed browser may be loaded. For example, in step 1505, a computing device (e.g., a mobile computing device, such as a laptop computer, tablet computer, smart phone, or other type of mobile device) may load a managed browser, similar to how such a managed browser may be loaded in step 505 (discussed above). The managed browser may, for instance, be configured to provide at least one managed mode in which one or more policies are applied to the managed browser, and the one or more policies may be configured to limit one or more functions of the managed browser, as discussed above. Additionally, the managed browser may, in some embodiments, be configured to provide secure browsing and caching of data obtained from at least one enterprise resource.

In step 1510, a managed execution environment may be provided within the managed browser. The managed execution environment may be configured to facilitate execution of one or more web applications, and the managed execution environment may be further configured to apply at least one policy of the one or more policies to the one or more web applications. For example, in step 1510, the computing device may provide a managed execution environment within the managed browser. The managed execution environment may, for instance, operate as a shell in which one or more web applications may be executed. The web applications that may be executed in the managed execution environment may, for instance, be written in and/or otherwise utilize various different programming languages (which may, e.g., be interpreted when executed by the computing device at runtime within the managed execution environment). Additionally or alternatively, one or more policies may be applied to web applications that are executed within the managed execution environment, and the one or more policies may be defined and/or imposed by the computing device, an MRM agent running on the computing device, the managed browser, and/or the managed execution environment itself. The policies that are applied to web applications within the managed execution environment may be similar to the policies discussed in the examples above and may, for instance, be enforced based on and/or otherwise depend on device state information (which may, e.g., include device state information for the computing device providing the managed execution environment).

In some embodiments, the managed execution environment may be configured to facilitate execution of at least one HTML5 (HyperText Markup Language 5) application. For example, in some instances, at least one web application of the one or more web applications that can be executed within the managed execution environment may be an HTML5 application that is, for instance, coded in HTML5 markup language.

In some embodiments, at least one policy of the one or more policies may be received from a policy management server. For example, in some instances, the one or more policies that may be applied to a web application in the managed execution environment may be received from a policy management server. Such a policy management server may, for instance, communicate directly with the managed execution environment on the computing device and/or with the managed browser and/or an MRM agent running on the computing device to provide new and/or updated policies to be applied to various web applications that may be executed in the managed execution environment within the managed browser.

In some embodiments, at least one policy (which may, e.g., be applied to the one or more web applications in the managed execution environment) may be configured to prevent the one or more web applications from accessing at least one local storage resource. For example, based on one or more policies that may be applied by the managed execution environment and/or based on device state information (which may, e.g., affect how specific policies are enforced, as in the examples discussed above), the managed execution environment and/or the computing device that is providing the managed execution environment within the managed browser may prevent one or more web applications in the managed execution environment from storing data in one or more local resources on the computing device. Additionally or alternatively, based on one or more policies that may be applied by the managed execution environment and/or based on device state information, the managed execution environment and/or the computing device that is providing the managed execution environment within the managed browser may prevent one or more web applications in the managed execution environment from accessing locally stored data (which may, e.g., be stored in one or more local resources on the computing device).

In some embodiments, at least one policy (which may, e.g., be applied to the one or more web applications in the managed execution environment) may be configured to selectively enable the one or more web applications to access at least one local storage. For example, based on one or more policies that may be applied by the managed execution environment and/or based on device state information (which may, e.g., affect how specific policies are enforced, as in the examples discussed above), the managed execution environment and/or the computing device that is providing the managed execution environment within the managed browser may allow one or more specific web applications in the managed execution environment to access data in one or more local resources on the computing device. Additionally or alternatively, based on one or more policies that may be applied by the managed execution environment and/or based on device state information, the managed execution environment and/or the computing device that is providing the managed execution environment within the managed browser may allow one or more specific web applications in the managed execution environment to store and/or modify data in one or more local resources on the computing device. In some instances, such a policy may additionally or alternatively require the one or more web applications to utilize one or more encryption functions (e.g., to encrypt data being accessed from and/or stored in the local resources) in instances in which the one or more web applications are interacting with local storage resources.

In some embodiments, the managed execution environment may be configured to expose a policy management agent on the computing device to the one or more web applications. For example, the managed execution environment and/or the computing device providing the managed execution environment within the managed browser may, in some instances, expose a policy management agent (which may, e.g., be an MRM agent, as discussed in the examples above) that is running on the computing device to the one or more web applications that may be executed in the managed execution environment. By exposing the policy management agent to the web applications in this manner, the managed execution environment may be able to extend policy management functionalities, secure key management functionalities, and/or other functionalities to the managed execution environment and/or the web applications in the managed execution environment.

In some embodiments, the managed execution environment may be configured to expose one or more functions to the one or more web applications via an application programming interface. For example, the managed execution environment and/or the computing device providing the managed execution environment within the managed browser may, in some instances, expose one or more functions to the one or more web applications via one or more interfaces that may allow such a web application provide higher-level functionalities than might be provided by other web applications. For example, the exposed functions may allow a web application in the managed execution environment to utilize encryption functionalities, secure tunneling functionalities, secure data storage functionalities, policy management functionalities, and/or other functionalities that may, for instance, be provided by other applications and/or services running on the computing device, such as an MRM agent running on the computing device.

In some embodiments, the managed execution environment may be configured to provide an authentication service for the one or more web applications. For example, the managed execution environment and/or the computing device providing the managed execution environment within the managed browser may, in some instances, provide an authentication service for one or more web applications in the managed execution environment. In providing such an authentication service, the managed execution environment and/or the computing device providing the managed execution environment may, for instance, handle multi-factor authentication processes for a web application, which may include obtaining credentials, maintaining keys, and/or providing credentials and/or keys to facilitate various handshakes in specific circumstances. In some instances, by handling such multi-factor authentication processes, the managed execution environment and/or the computing device providing the managed execution environment may enable execution of one or more specific functions within a particular web application and/or enable execution of a web application itself.

In some embodiments, the managed execution environment may be configured to apply a default set of policies to the one or more web applications. For example, the managed execution environment and/or the computing device providing the managed execution environment may, in some instances, a default set of policies or a "policy bundle" to one or more specific web applications in the managed execution environment. The default set of policies may, for instance, be received from and/or periodically updated by a policy management server. In addition, the default set of policies may be applied to a particular web application in the managed execution environment unless a different and/or customized set of policies is defined for the web application.

In some embodiments, the managed execution environment may be configured to dynamically update a set of policies applied to the one or more web applications. For example, the managed execution environment and/or the computing device providing the managed execution environment may, in some instances, dynamically update and/or otherwise modify on-the-fly the policies that are applied to a specific web application in the managed execution environment based on device state information and/or user information (which may, e.g., include user role information) to change, in real-time, the behavior of the managed execution environment based on current usage context of the device. For instance, based on device state information (which may, e.g., include information about what other applications are running, installed on, and/or otherwise present on the user computing device; where the user computing device is located; what networks the user computing device is connected to; etc.), the managed execution environment and/or the computing device providing the managed execution environment may selectively enable and/or selectively disable one or more policies that may be applied to one or more web applications in the managed execution environment. As another example, based on a change in user information (which may, e.g., occur as a result of a user switching accounts and/or as a result of a different user logging into the device), the managed execution environment and/or the computing device providing the managed execution environment may selectively enable and/or selectively disable one or more policies that may be applied to one or more web applications in the managed execution environment. In this manner, the managed execution environment may dynamically adapt to changing conditions that may require different levels of controls to be imposed upon the web applications that are present in and/or being executed in the managed execution environment.

As illustrated above, various aspects of the disclosure relate to providing a managed browser on a mobile computing device. In other embodiments, however, the concepts discussed herein can be implemented in any other type of computing device (e.g., a desktop computer, a server, a console, a set-top box, etc.). Thus, although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method, comprising:
   loading, by a computing device, a managed browser, the managed browser being configured to provide at least one managed mode in which one or more policies are applied to the managed browser, the one or more policies being configured to limit at least one function of the managed browser; and
   providing, by the computing device, a managed execution environment within the managed browser,
   wherein the managed execution environment is configured to facilitate execution of one or more web applications,
   wherein the managed execution environment is configured to apply at least one policy of the one or more policies to the one or more web applications, and
   wherein the managed execution environment is configured to expose a mobile resource management (MRM) agent on the computing device to the one or more web applications, the MRM agent being configured to monitor state information associated with the computing device and enforce policies based on the state information,
   wherein the managed execution environment is configured to expose one or more functions to the one or more web applications via an application programming interface, and
   wherein at least one function of the one or more functions exposed to the one or more web applications via the application programming interface includes a secure data storage function.

2. The method of claim 1, wherein the managed execution environment is configured to facilitate execution of at least one HTML5 application.

3. The method of claim 1, wherein at least one policy of the one or more policies is received from a policy management server.

4. The method of claim 1, wherein the at least one policy is configured to prevent the one or more web applications from accessing at least one local storage resource.

5. The method of claim 1, wherein the at least one policy is configured to selectively enable the one or more web applications to access at least one local storage.

6. The method of claim 1, wherein the managed execution environment is configured to provide an authentication service for the one or more web applications.

7. The method of claim 1, wherein the managed execution environment is configured to apply a default set of policies to the one or more web applications.

8. The method of claim 1, wherein the managed execution environment is configured to dynamically update a set of policies applied to the one or more web applications.

9. A computing device, comprising:
   at least one processor; and
   memory storing computer-readable instructions that, when executed by the at least one processor, cause the computing device to:
   load a managed browser, the managed browser being configured to provide at least one managed mode in which one or more policies are applied to the managed browser, the one or more policies being configured to limit at least one function of the managed browser; and
   provide a managed execution environment within the managed browser,
   wherein the managed execution environment is configured to facilitate execution of one or more web applications,
   wherein the managed execution environment is configured to apply at least one policy of the one or more policies to the one or more web applications, and
   wherein the managed execution environment is configured to expose a mobile resource management (MRM) agent on the computing device to the one or more web applications, the MRM agent being configured to monitor state information associated with the computing device and enforce policies based on the state information,
   wherein the managed execution environment is configured to expose one or more functions to the one or more web applications via an application programming interface, and
   wherein at least one function of the one or more functions exposed to the one or more web applications via the application programming interface includes a secure data storage function.

10. The computing device of claim 9, wherein the managed execution environment is configured to facilitate execution of at least one HTML5 application.

11. The computing device of claim 9, wherein at least one policy of the one or more policies is received from a policy management server that is configured to communicate with the MRM agent to provide policies to be applied to the one or more web applications.

12. The computing device of claim 9, wherein the at least one policy is configured to prevent the one or more web applications from accessing at least one local storage resource based on the state information monitored by the MRM agent.

13. The computing device of claim 9,
    wherein the at least one policy is configured to selectively enable the one or more web applications to access at least one local storage based on the state information monitored by the MRM agent, and
    wherein the at least one policy is further configured to require the one or more web applications to utilize an encryption function when interacting with the at least one local storage.

14. The computing device of claim 9,
    wherein at least one function of the one or more functions exposed to the one or more web applications via the application programming interface includes a secure tunneling function.

15. The computing device of claim 9,
    wherein the managed execution environment is configured to provide an authentication service for the one or more web applications,
    wherein providing the authentication service for the one or more web applications includes handling at least one multi-factor authentication process for at least one web application of the one or more web applications, and wherein handling the at least one multi-factor authentication process for the at least one web application includes obtaining one or more credentials, maintaining one or more keys, and providing at least one of the one or more credentials and the one or more keys to facilitate at least one handshake.

16. The computing device of claim 9, wherein the managed execution environment is configured to apply a default set of policies to the one or more web applications, the default set of policies including a policy bundle for one or more specific web applications of the one or more web applications.

17. One or more non-transitory computer-readable media having instructions stored thereon that, when executed, cause a computing device to:

load a managed browser, the managed browser being configured to provide at least one managed mode in which one or more policies are applied to the managed browser, the one or more policies being configured to limit at least one function of the managed browser; and provide a managed execution environment within the managed browser, wherein the managed execution environment is configured to facilitate execution of one or more web applications, wherein the managed execution environment is configured to apply at least one policy of the one or more policies to the one or more web applications, and wherein the managed execution environment is configured to expose a mobile resource management (MRM) agent on the computing device to the one or more web applications, the MRM agent being configured to monitor state information associated with the computing device and enforce policies based on the state information, wherein the managed execution environment is configured to expose one or more functions to the one or more web applications via an application programming interface, and wherein at least one function of the one or more functions exposed to the one or more web applications via the application programming interface includes a secure data storage function.

18. The method of claim 1, wherein the managed execution environment is configured to extend at least one secure key management function to the one or more web applications via the MRM agent.

* * * * *